United States Patent
Pathak et al.

(10) Patent No.: US 10,416,213 B2
(45) Date of Patent: Sep. 17, 2019

(54) ULTRA-SENSITIVE, ULTRA-LOW POWER RF FIELD SENSOR

(71) Applicant: Nokomis, Inc., Charleroi, PA (US)

(72) Inventors: Bogdan Amaru Pathak, Toledo, OH (US); Walter John Keller, Bridgeville, PA (US)

(73) Assignee: NOKOMIS, INC., Charleroi, PA (US)

( * ) Notice: Subject to any disclaimer, the term of this patent is extended or adjusted under 35 U.S.C. 154(b) by 708 days.

(21) Appl. No.: 14/927,059

(22) Filed: Oct. 29, 2015

(65) Prior Publication Data
US 2016/0124041 A1 May 5, 2016

Related U.S. Application Data

(60) Provisional application No. 62/122,766, filed on Oct. 29, 2014.

(51) Int. Cl.
*G01R 29/08* (2006.01)
*H01L 23/00* (2006.01)
*G06F 21/87* (2013.01)

(52) U.S. Cl.
CPC ......... *G01R 29/08* (2013.01); *G01R 29/0814* (2013.01); *H01L 23/576* (2013.01); *G06F 21/87* (2013.01)

(58) Field of Classification Search
CPC .. G01R 29/08; G01R 29/0814; G01R 31/001; G01R 31/002; H01L 23/576; G06F 21/87
See application file for complete search history.

(56) References Cited

U.S. PATENT DOCUMENTS

| 4,696,525 | A | * | 9/1987 | Coller | H05K 7/1046 |
| | | | | | 439/69 |
| 5,801,657 | A | * | 9/1998 | Fowler | H03M 1/123 |
| | | | | | 341/155 |
| 7,515,094 | B2 | | 4/2009 | Keller, III | |
| 8,063,813 | B1 | | 11/2011 | Keller | |
| 8,537,050 | B2 | | 9/2013 | Freeman et al. | |
| 8,643,539 | B2 | | 2/2014 | Pauly et al. | |

(Continued)

FOREIGN PATENT DOCUMENTS

WO 2015134148 11/2015

OTHER PUBLICATIONS

Y.P. Zhang, Duixian Liu, Antenna-on-Chip and Antenna-in-Package Solutions to Highly Inegrated Millimeter-Wave Devices for Wireless Communication, 2009, vol. 57 No. 10.

*Primary Examiner* — Huy Q Phan
*Assistant Examiner* — Dustin R Dickinson
(74) *Attorney, Agent, or Firm* — AP Patents

(57) ABSTRACT

A sensor includes a hollow enclosure, an antenna disposed external to the hollow enclosure and configured to collect emission of electromagnetic energy, a circuit disposed within the hollow enclosure and comprising a low noise amplifier (LNA) connectable to the antenna, and an analog to digital converter (ADC) in a connection with the LNA, circuit connections connecting, during use of the sensor, the circuit to each of the antenna, a source of electric energy and a signal processing component, a connection between the enclosure and an enclosure of an integrated circuit (IC), whereby the antenna id disposed between the sensor and the IC, and the sensor configured to at least measure a low-level electromagnetic energy emitted from the IC.

17 Claims, 13 Drawing Sheets

(56) References Cited

U.S. PATENT DOCUMENTS

| | | | |
|---|---|---|---|
| 8,825,823 B2 | 9/2014 | Keller, III | |
| 9,059,189 B2 | 6/2015 | Keller, III et al. | |
| 2002/0167313 A1* | 11/2002 | Taimisto | A61B 5/06 |
| | | | 324/260 |
| 2002/0181208 A1* | 12/2002 | Credelle | G06K 19/07749 |
| | | | 361/737 |
| 2009/0122898 A1* | 5/2009 | Sun | H04B 7/0868 |
| | | | 375/267 |
| 2010/0141394 A1* | 6/2010 | Sugiyama | G06K 7/0008 |
| | | | 340/10.4 |
| 2011/0320170 A1 | 12/2011 | Pathak et al. | |
| 2012/0223403 A1* | 9/2012 | Keller, III | H01L 23/576 |
| | | | 257/428 |
| 2012/0226463 A1 | 9/2012 | Keller, III et al. | |
| 2013/0202020 A1* | 8/2013 | Diez | H04B 17/0085 |
| | | | 375/227 |
| 2013/0328416 A1* | 12/2013 | Whitworth | H02J 17/00 |
| | | | 307/149 |
| 2013/0328710 A1 | 12/2013 | Keller, III | |
| 2014/0218229 A1 | 8/2014 | Pauly et al. | |
| 2015/0009073 A1 | 1/2015 | Keller, III | |
| 2015/0137830 A1 | 5/2015 | Keller, III | |

\* cited by examiner

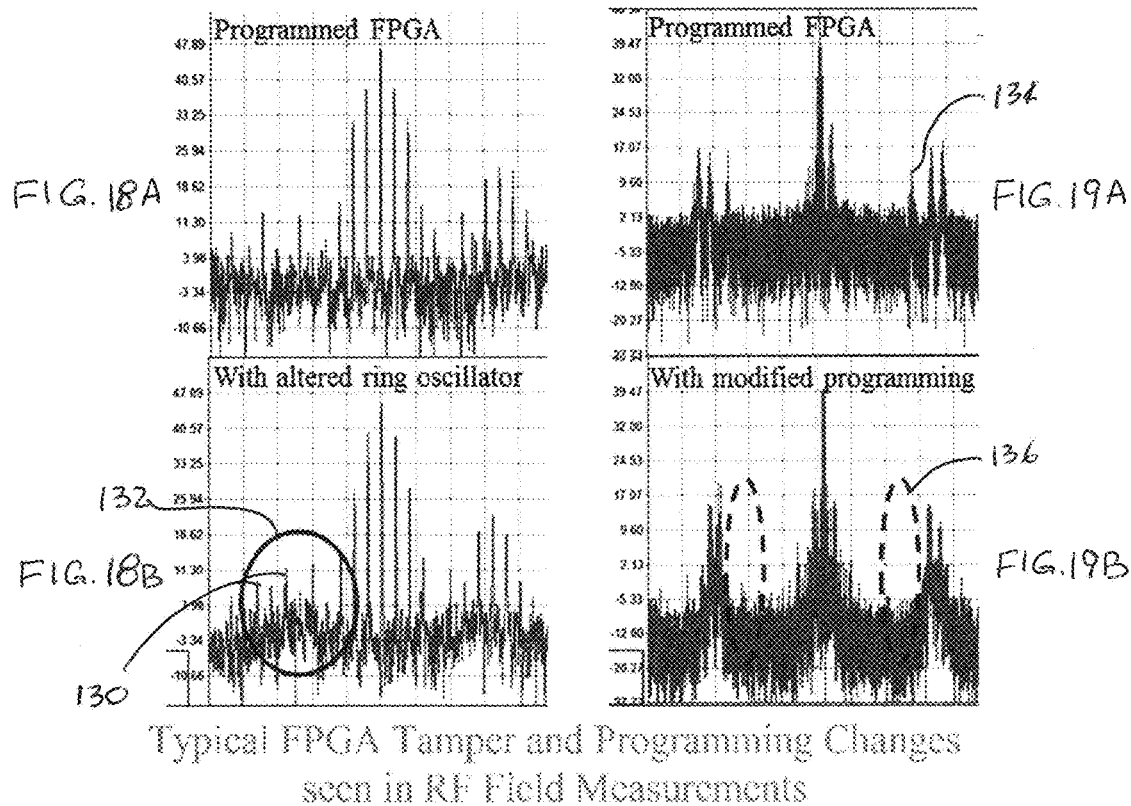

ULTRA-SENSITIVE, ULTRA-LOW POWER RF FIELD SENSOR

CROSS REFERENCE TO RELATED APPLICATIONS

This patent application is related to and claims priority from U.S. Provisional Patent Application Ser. No. 62/122,766 filed Oct. 29, 2014 and its disclosure is being incorporated into this document by reference thereto.

This document incorporates by reference the disclosures and/or teachings of the following documents: U.S. Pat. No. 7,515,094 issued to Walter J. Keller on Apr. 7, 2009 and entitled "ADVANCED ELECTROMAGNETIC LOCATION OF ELECTRONIC EQUIPMENT"; U.S. Pat. No. 8,063,813 issued to Walter J. Keller on Nov. 22, 2011 and entitled "ACTIVE IMPROVISED EXPLOSIVE DEVICE (IED) ELECTRONIC SIGNATURE DETECTION"; U.S. Pat. No. 8,537,050 issued to Stephen Dorn Freeman on Sep. 17, 2013 and entitled "IDENTIFICATION AND ANALYSIS OF SOURCE EMISSIONS THROUGH HARMONIC PHASE COMPARISON"; U.S. Pat. No. 8,643,539 issued to Gerald William Pauly on Feb. 4, 2014 entitled "ADVANCE MANUFACTURING MONITORING AND DIAGNOSTIC TOOL"; U.S. Pat. No. 8,825,823 issued to Walter J. Keller on Sep. 2, 2014 and entitled "SYSTEM AND METHOD FOR PHYSICALLY DETECTING, IDENTIFYING, DIAGNOSING AND GEOLOCATING ELECTRONIC DEVICES CONNECTABLE TO A NETWORK"; U.S. Pat. No. 9,059,189 issued to Walter J. Keller on Jun. 16, 2015 and entitled "INTEGRATED CIRCUIT WITH ELECTROMAGNETIC ENERGY ANOMALY DETECTION AND PROCESSING"; US Pub. 2011/0320170 entitled "METHOD AND APPARATUS FOR THE DIAGNOSIS AND PROGNOSIS OF ACTIVE IMPLANTS IN OR ATTACHED TO BIOLOGICAL HOSTS OR SYSTEMS"; US Pub. 2012/0226463 entitled "SYSTEM AND METHOD FOR PHYSICALLY DETECTING COUNTERFEIT ELECTRONICS"; US Pub. 2013/0229310 entitled "SYSTEM AND METHOD FOR GEO-LOCATING AND DETECTING SOURCE OF ELECTROMAGNETIC EMISSIONS"; US Pub. 2013/0328710, entitled "METHOD AND APPARATUS FOR DETECTION AND IDENTIFICATION OF COUNTERFEIT AND SUBSTANDARD ELECTRONICS"; US Pub. 2015/0137830 entitled "METHOD AND APPARATUS FOR DETECTION AND IDENTIFICATION OF COUNTERFEIT AND SUBSTANDARD ELECTRONICS"; US Pub. 2014/0218229 entitled "ADVANCE MANUFACTURING MONITORING AND DIAGNOSTIC TOOL"; US Pub. 2015/0009073 entitled "SYSTEM AND METHOD FOR PHYSICALLY DETECTING, IDENTIFYING, DIAGNOSING AND GEOLOCATING ELECTRONIC DEVICES CONNECTABLE TO A NETWORK"; U.S. Ser. No. 13/712,031 entitled "METHOD AND APPARATUS FOR BATTLE DAMAGE ASSESSMENT OF ELECTRIC OR ELECTRONIC DEVICES AND SYSTEMS" and PCT/US2015/014765 entitled "METHOD AND APPARATUS FOR DETECTION AND IDENTIFICATION OF COUNTERFEIT AND SUBSTANDARD ELECTRONICS".

STATEMENT REGARDING FEDERALLY SPONSORED RESEARCH AND DEVELOPMENT

N/A

REFERENCE TO SEQUENCE LISTING, A TABLE, OR A COMPUTER PROGRAM LISTING COMPACT DISC APPENDIX

N/A

BACKGROUND

1. Technical Field

The subject matter relates to a sensor for measurement of low-level electromagnetic fields that can be used to discern possible tampering or modification of hardware, firmware or software installed on a board or in an electronic module.

2. Description of Related Art

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Conventionally, employed solutions for detecting counterfeited, tampered or infected chips (integrated circuits) may rely on additional equipment monitoring I/O lines of suspect chips for correct anticipated expected intentional output patterns based on intentionally designed signals. Further, conventionally employed solutions may require the device or system under test to be allocated solely for testing purposes and may not typically permit testing during an intended (normal) operation of the device or system.

Conventionally, employed solutions for detecting counterfeited, tampered or infected chips at a minimum may require intrusive circuit modifications or software modifications and wiring to intercept or analyze signals traveling to or from the device, system or subsystem.

Conventionally, employed solutions for detecting counterfeited, tampered or infected chips may require may require a human interface to connect the device containing such chip(s) to a test equipment and carry-out hardware and/or software tests, resulting in undesirable costs associated with such detection.

Therefore, there is a need for a solution in detecting counterfeited, tampered or infected chips that at least does not require any one of intrusive circuits modifications, extra labor costs, added power requirements and that can be easily implemented on existing devices.

BRIEF DESCRIPTION OF THE DRAWINGS

The accompanying drawings are incorporated in and constitute part of the specification and illustrate various embodiments. In the drawings:

FIGS. 18A-18B illustrates an exemplary comparison between unmodified and modified FPGA;

FIGS. 19A-19B illustrates another exemplary comparison between unmodified and modified FPGA.

DETAILED DESCRIPTION OF EXEMPLARY EMBODIMENTS

Figure 1:
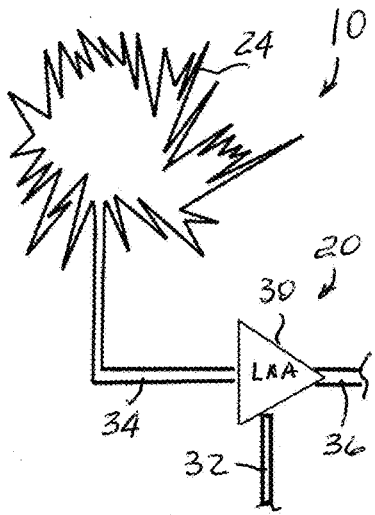
FIG. 1 illustrates a diagram of one exemplary embodiment of a RF field sensor.

Prior to proceeding to the more detailed description of the claimed subject matter it should be noted that, for the sake of clarity and understanding, identical components which have identical functions have been identified with identical reference numerals throughout the several views illustrated in the drawing figures.

The following detailed description is merely exemplary in nature and is not intended to limit the described examples or the application and uses of the described examples. As used herein, the words "example", "exemplary" or "illustrative" means "serving as an example, instance, or illustration." Any implementation described herein as "example", "exemplary" or "illustrative" is not necessarily to be construed as preferred or advantageous over other implementations. All of the implementations described below can be exemplary implementations provided to enable persons skilled in the art to make or use the embodiments of the disclosure and can be not intended to limit the scope of the disclosure, which is defined by the claims. For purposes of description herein, the terms "upper," "lower," "left," "rear," "right," "front," "vertical," "horizontal," "exterior," "interior," and derivatives thereof shall relate to the invention as oriented in the Figures. Furthermore, there is no intention to be bound by any expressed or implied theory presented in the preceding technical field, background, or the following detailed description. It is also to be understood that the specific devices and processes illustrated in the attached drawings, and described in the following specification, can be simply examples of the inventive concepts defined in the appended claims. Hence, specific dimensions and other physical characteristics relating to the examples disclosed herein can be not to be considered as limiting, unless the claims expressly state otherwise.

The terms and words used in the following description and claims can be not limited to the bibliographical meanings, but, can be merely used by the inventor to enable a clear and consistent understanding of the invention. Accordingly, it should be apparent to those skilled in the art that the following description of exemplary embodiments of the invention can be provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a circuit board" includes reference to one or more of such circuit board.

The term "integrated circuit" or "monolithic integrated circuit" refers to circuit(s) in which all or some of the circuit elements are inseparably associated and electrically interconnected and are disposed on a plate (die) of a semiconductor material so that it is considered to be indivisible for the purposes of construction and commerce. Circuit 20s meeting this definition can be constructed using many different technologies, including thin-film transistor, thick film technology or hybrid integrated circuit. The "integrated circuit" may be referred to in this document as "IC", "chip" or a "microchip".

Integrated Circuits (ICs), that may be also referred to as "chips" enable and control functionality of many devices, where the device which can be any one of a sub-assembly, an assembly, apparatuses, a system, a computer, a controller, a server, a network and the like. ICs are inextricably tied to ambient Radio Frequency (RF) fields surrounding each device when in use, specifically, the unintended RF emissions radiated by an IC are causally related to its authenticity, programming, functionality and internal status.

Every electrical and electronic device gives off electromagnetic emissions when operating or when being only powered ON. The power can be external commercial power, battery power or internal power generation mechanisms. At the most basic level, electrons accelerating, when the electronic device is powered ON, give off electromagnetic energy creating an electromagnetic signature. Thus, the signature of the electromagnetic emission given off is a property of any electronic device.

Term "signature" is intended to mean herein a constructed combination-construction of two or more components of a single artifact, two or more components of multiple artifacts or a single component of a single artifact.

The term "artifact" used herein refers to its definition as "something observed in a scientific investigation or experiment that is not naturally present but occurs as a tangible and/or measurable result of the preparative or investigative procedure".

In other words, term "artifact" is intended to mean herein a characteristic that is generated by the device due to application or coupling of RF energy with highly specific frequency(s), amplitude, polarization, location, orientation, waveform and/or other characteristics to the device. Artifacts created may include, without limitation, component(s) such as EM wave, frequency feature, for example such as shift, non-linear response, peak location, relative dB height, spacings between peaks in a single emission, phase noise present, relationships, for example such as spacings between peeks, in multiple unintentional frequency emissions arising and present, EM polarizations, etc. More specifically, the exemplary embodiments focus on frequency feature unintentionally (not intended by the manufacturer) generated and re-emitted due to illumination with RF energy. As an example, the peak location and relative dB height of new peaks appearing as a result of and far from a fundamental single illumination frequency would be derived and byproduct of the design and constructions of the device and hence be considered a frequency artifact(s).

The particular embodiments of the present disclosure can be focused on emission of unintended electromagnetic energy and, more particularly, the emission of unintended electromagnetic energy being in a Radio Frequency (RF) spectrum, which is typically referred to in the art as frequencies below 300 GHZ, although infrared, infrasonic and other emissions are also contemplated by the exemplary embodiments.

The particular embodiments of the present disclosure generally provide a sensor 10 configured to measure a low-level electromagnetic energy emitted from electrical and/or electronic devices, for example such as Integrated Circuits (IC) or chips, where this emitted energy can be used to discern tampering or modification, or any attempts thereof, of hardware, firmware or software installed on a board or in an electronic module.

The sensor 10 comprises a circuit 20.

FIG. 1 illustrates one exemplary circuit 20 that comprises a low noise amplifier (LNA) 30. The LNA 30 has a power connection 32 to a source of electric energy. The power connection 32 may also comprise a ground connection. The LNA 30 is configured or selected to operate within a specific range, for example such as between 40 Mhz and 100 MHz or within any increment thereof. The LNA 30 may be also operate a frequencies below 40 MHz or above 100 MHz. The LNA 30 could be of the type as manufactured by Hittite Microwave of Chelmsford Mass. manufactured under model number HMC549MSBG, or RF-Lambda of San Diego Calif. manufactured under model number R04M96MSA. The sensor 10 also comprises an antenna 24 configured and operable to collect emission of electromagnetic energy. The LNA 30 has a direct input connection (or coupling) 34 with the antenna 24. During use of the sensor 10, the LNA 30 amplifies low power RF energy collected at the antenna 24. LNA 30 also has another connection 36 to communicate amplified RF energy external to the sensor 10, for example to an external signal processing component 70. The antenna 24 and LNA 30 can be disposed in the same plane, i.e. one layer, with each other or can be disposed within two different layers, separated by a shield 28.

Figure 2:
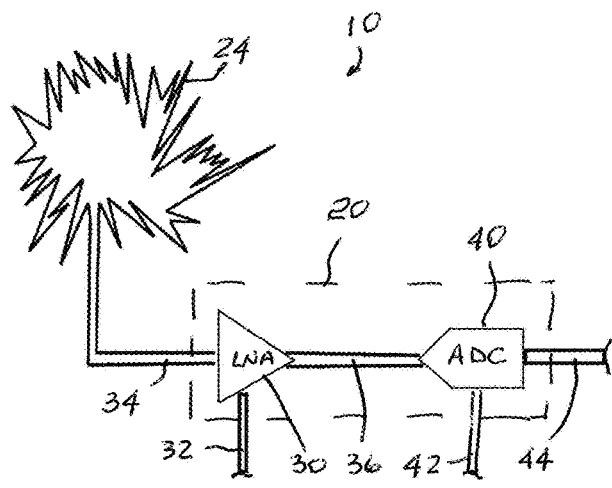
FIG. 2 illustrates a diagram of another exemplary embodiment of a RF field sensor.

FIG. 2 illustrates another exemplary circuit 20 that comprises a low noise amplifier (LNA 30) and an analog-to-digital converter (ADC) 40. LNA 30, during use, has a direct input connection (or coupling) 34 with the antenna 24 and that amplifies signal output from the antenna 24. The LNA 30 also has a power connection 32 to a source of electric energy. Power connection 32 may also comprise a ground connection. LNA 30 further has a connection 36 with the input of ADC 40. The LNA 30 is configured or selected to operate within a specific range, for example such as between 40 Mhz and 100 MHz or within any increment thereof. The LNA 30 may be also operate a frequencies below 40 MHz or above 100 MHz. The LNA 30 could be of the type as manufactured by Hittite Microwave of Chelmsford Mass. manufactured under model number HMC549MSBG, or RF-Lambda of San Diego Calif. manufactured under model number R04M96MSA. ADC 40 also has a power connection 42 to a source of electric energy. The ADC 40 is configured and operable to transform received analog signal from the LNA 30 to digital signal for further analysis and processing in the signal processing component 70. The output from the ADC 40 has a connection 44 to communicate, during use of the sensor 10, converted signal external to the sensor 10, for example to an external signal processing component 70. The ADC 40 could be of the type RF ADC 40 as manufactured by Texas Instruments of TX manufactured under model number ADS5482.

The LNA 30 and ADC 40 may be disposed in the same plane with each other enclosure or may be disposed, as layers, one above the other. If the LNA 30 and ADC 40 are disposed above one another, the sensor 10 may comprise an optional shield 28 between LNA 30 and ADC 40 so as to potentially compensate for increased noise.

The sensor 10 of FIG. 2 may also comprise the antenna 24. When the sensor 10 of FIG. 2 comprises the antenna 24, the combination of the antenna 24 and LNA 30 may be referred to as a "sensor node" or a "front end".

Figure 3:
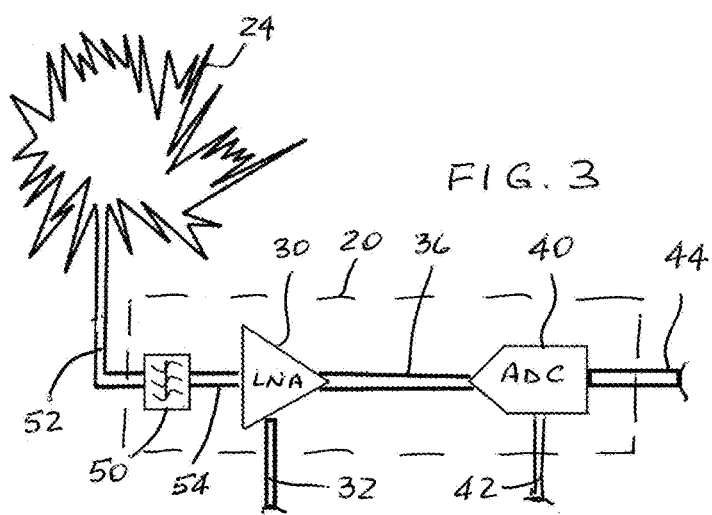
FIG. 3 illustrates a diagram of another exemplary embodiment of a RF field sensor.

FIG. 3 illustrates another exemplary circuit 20 that comprises the above described LNA 30 and ADC 40 and further comprises a filter 50 being disposed between the antenna 24 and LNA 30. The filter 50 has a direct connection 52 with the antenna 24 and a direct connection 54 with the LNA 30. The filter 50 is operable to pass a specific or desired frequency range or band from the antenna 24 to LNA 30 and at least reduce if not completely eliminate saturation, clipping and/or distortion of the signal from the antenna 24 filter 50 to LNA 30. The filter 50 can be a band pass filter, an LC circuit 20, a ceramic resonator, configured or selected to operate in a specific frequency range. The filter 50 can be also a band-stop filter, configured to eliminate an undesired band of frequencies, a low-pass filter configured to allow passage only of frequencies below cut-off frequency or high-pass filter configured to allow passage only of frequencies above cut-off frequency. The LNA 30 has the above described power connection 32 to a source of electric energy that may also comprise a connection to ground. LNA 30 further has a connection 36 with the input of ADC 40. The LNA 30 is configured or selected to operate within a specific range, for example such as between 40 Mhz and 100 MHz or within any increment thereof. The LNA 30 may be also operate a frequencies below 40 MHz or above 100 MHz. The LNA 30 could be of the type as manufactured by Hittite Microwave of Chelmsford Mass. manufactured under model number HMC549MSBG, or RF-Lambda of San Diego Calif. manufactured under model number R04M96MSA. The ADC 40 also has a power connection 42 to a source of electric energy. The ADC 40 is configured and operable to transform received analog signal from the LNA 30 to digital signal for further analysis and processing in the signal processing component 70. The output from the ADC 40 has a connection 44 to communicate, during use of the sensor 10, converted signal external to the sensor 10, for example to an external signal processing component 70. The ADC 40 could be of the type RF ADC 40 as manufactured by Texas Instruments of TX manufactured under model number ADS5482.

The filter 50 can be disposed in the same plane as the LNA 30 and ADC 40 or may be disposed above one or both of LNA 30 and ADC 40. If the filter 50 is disposed above one or both LNA 30 and ADC 40, the sensor 10 may comprise an optional shield 28 between the filter 50 and one or both LNA 30 and ADC 40 so as to potentially compensate for increased noise.

The sensor 10 of FIG. 3 may also comprise the antenna 24. When the sensor 10 of FIG. 3 comprises the antenna 24, the combination of the antenna 24 and LNA 30 may be referred to as a "sensor node" or a "front end".

Figure 4:
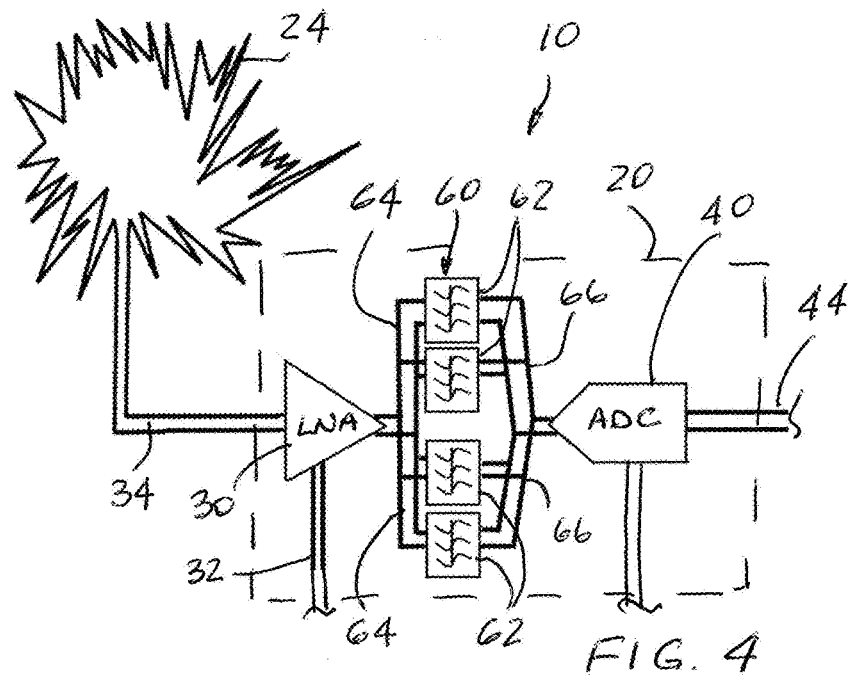
FIG. 4 illustrates a diagram of another exemplary embodiment of a RF field sensor.

FIG. 4, illustrates another exemplary circuit 20 that comprises the above described LNA 30 and ADC 40 and further comprises a selectable filter bank 60 being disposed in a connection between the LNA 30 and ADC 40. The LNA 30 has the above described power connection 32 to a source of electric energy that may also comprise a connection to ground. Filter 60 has connections 64 with the LNA 30 and further has connection 66 with the input of the ADC 40. The LNA 30 is configured or selected to operate within a specific range, for example such as between 40 Mhz and 100 MHz or within any increment thereof. The LNA 30 may be also operate a frequencies below 40 MHz or above 100 MHz. The LNA 30 could be of the type as manufactured by Hittite Microwave of Chelmsford Mass. manufactured under model number HMC549MSBG, or RF-Lambda of San Diego Calif. manufactured under model number R04M96MSA. The ADC 40 also has a power connection 42 to a source of electric energy. The ADC 40 is configured and operable to transform received analog signal from the LNA 30 to digital signal for further analysis and processing in the signal processing component 70. The output from the ADC 40 has a connection 44 to communicate, during use of the sensor 10, converted signal external to the sensor 10, for example to an external signal processing component 70. The ADC 40 could be of the type RF ADC 40 as manufactured by Texas Instruments of TX manufactured under model number ADS5482.

The selectable filter bank 60 comprises one or more filters 62, each configured and operable to separate the frequency signal from LNA 30 into components, each carrying a single frequency sub-band of the frequency signal. Although 4 filters 62 are shown in FIG. 4, the sensor 10 may comprise less or more filters 62. The selectable filter bank 60 then passes frequency signal components from the LNA 30 to ADC 40 and at least reduce if not completely eliminate saturation, clipping and/or distortion of the signal from the antenna 24 to LNA 30. The filter bank 60 can be of a bandpass SAW wave type manufactured by API Technologies of the United Kingdom.

The filter bank 60 has connections 64 with LNA 30 and connections 66 with the ADC 40.

The filter bank 60 can be disposed in the same plane as the LNA 30 and ADC 40 and may be disposed in a different layer from one or both LNA 30 and ADC 40. If the filter bank 60 is disposed in a different layer from one or both LNA 30 and ADC 40, the sensor 10 may comprise an optional shield 28 between the filter bank 60 and one or both LNA 30 and ADC 40 so as to potentially compensate for unwanted high power signals at adjacent frequencies which can cause clipping and phantom new frequency signal artifacts.

The sensor 10 of FIG. 4 may also comprise the antenna 24. When the sensor 10 of FIG. 4 comprises the antenna 24, the combination of the antenna 24 and LNA 30 may be referred to as a "sensor node" or a "front end".

Figure 5:
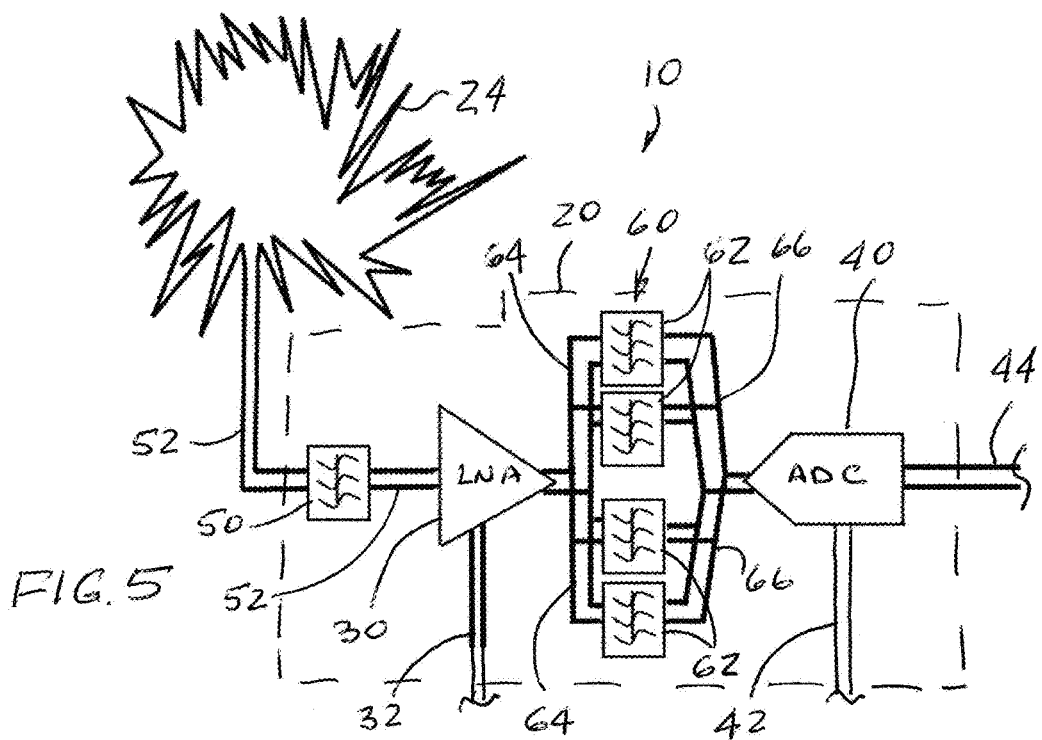
FIG. 5 illustrates a diagram of another exemplary embodiment of a RF field sensor.

FIG. 5, illustrates another exemplary circuit 20 that comprises the above described LNA 30 and ADC 40 and further comprises both the filter 50 being disposed in a connection between the antenna 24 and LNA 30 and the selectable filter bank 60 being disposed in a connection between the LNA 30 and ADC 40.

The filter 50 has a direct connection 52 with the antenna 24 and a direct connection with the LNA 30. The filter 50 is operable to pass a specific or desired frequency range or band from the antenna 24 to LNA 30 and at least reduce if not completely eliminate saturation, clipping and/or distortion of the signal from the antenna 24 filter 50 to LNA 30. The filter 50 can be a band pass filter, an LC circuit, a ceramic resonator, configured or selected to operate in a specific frequency range. The filter can be also a band-stop filter, configured to eliminate an undesired band of frequencies, a low-pass filter configured to allow passage only of frequencies below cut-off frequency or high-pass filter configured to allow passage only of frequencies above cut-off frequency. The LNA 30 has the above described power connection 32 to a source of electric energy that may also comprise a connection to ground. The LNA 30 is configured or selected to operate within a specific range, for example such as between 30 Mhz and 100 MHz or within any increment thereof. The LNA 30 may be also operate a frequencies below 30 MHz or above 100 MHz. The LNA 30 could be of the type as manufactured by Hittite Microwave of Chelmsford Mass. manufactured under model number HMC549MSBG, or RF-Lambda of San Diego Calif. manufactured under model number R04M96MSA. The ADC 40 also has a power connection 42 to a source of electric energy. The ADC 40 is configured and operable to transform received analog signal from the LNA 30 to digital signal for further analysis and processing in the signal processing component 70.

The output from the ADC 40 has a connection 44 to communicate, during use of the sensor 10, transformed or converted signal external to the sensor 10, for example to an external signal processing component 70. The ADC 40 could be of the type RF ADC 40 as manufactured by Texas Instruments of TX manufactured under model number ADS5482.

The selectable filter bank 60 is operable to separate the frequency signal from LNA 30 into components, each carrying a single frequency sub-band of the frequency signal. The selectable filter bank 60 then passes frequency signal components from the LNA 30 to ADC 40 and at least reduce if not completely eliminate saturation, clipping and/or distortion of the signal from the antenna 24 to LNA 30. The filter bank 60 can be of a bandpass SAW wave type manufactured by API Technologies of the United Kingdom.

The filter bank 60 has connections 64 with LNA 30 and connections 66 with ADC 40.

The filter bank 60 can be disposed in the same plane as the filter 50, LNA 30 and ADC 40 and may be disposed in a different layer from one or all of filter 50, LNA 30, and ADC 40. If the filter bank 60 is disposed in a different layer from one or all of LNA 30, ADC 40 and filter 50, the sensor 10 may comprise an optional shield 28 between the filter bank 60 and one or all of LNA 30, ADC 40 and filter 50 so as to potentially compensate for unwanted high power signals at adjacent frequencies which can cause clipping and phantom new frequency signal artifacts.

The sensor 10 of FIG. 5 may also comprise the antenna 24. When the sensor 10 of FIG. 5 comprises the antenna 24, the combination of the antenna 24 and LNA 30 may be referred to as a "sensor node" or a "front end".

This embodiment is advantageous when/for to prevent the LNA 30 from being saturated, which can cause clipping and phantom new frequency signal artifacts.

As was mentioned above, each of the FIGS. 1-5 also illustrates an example embodiment wherein antenna 24 is a component or member of a respective circuit 20. In each example of FIGS. 1-5, the circuit 20 is configured to transform raw energy received at the antenna 24 into an electrical signal that can be processed and analyzed at the 74.

Figure 6:
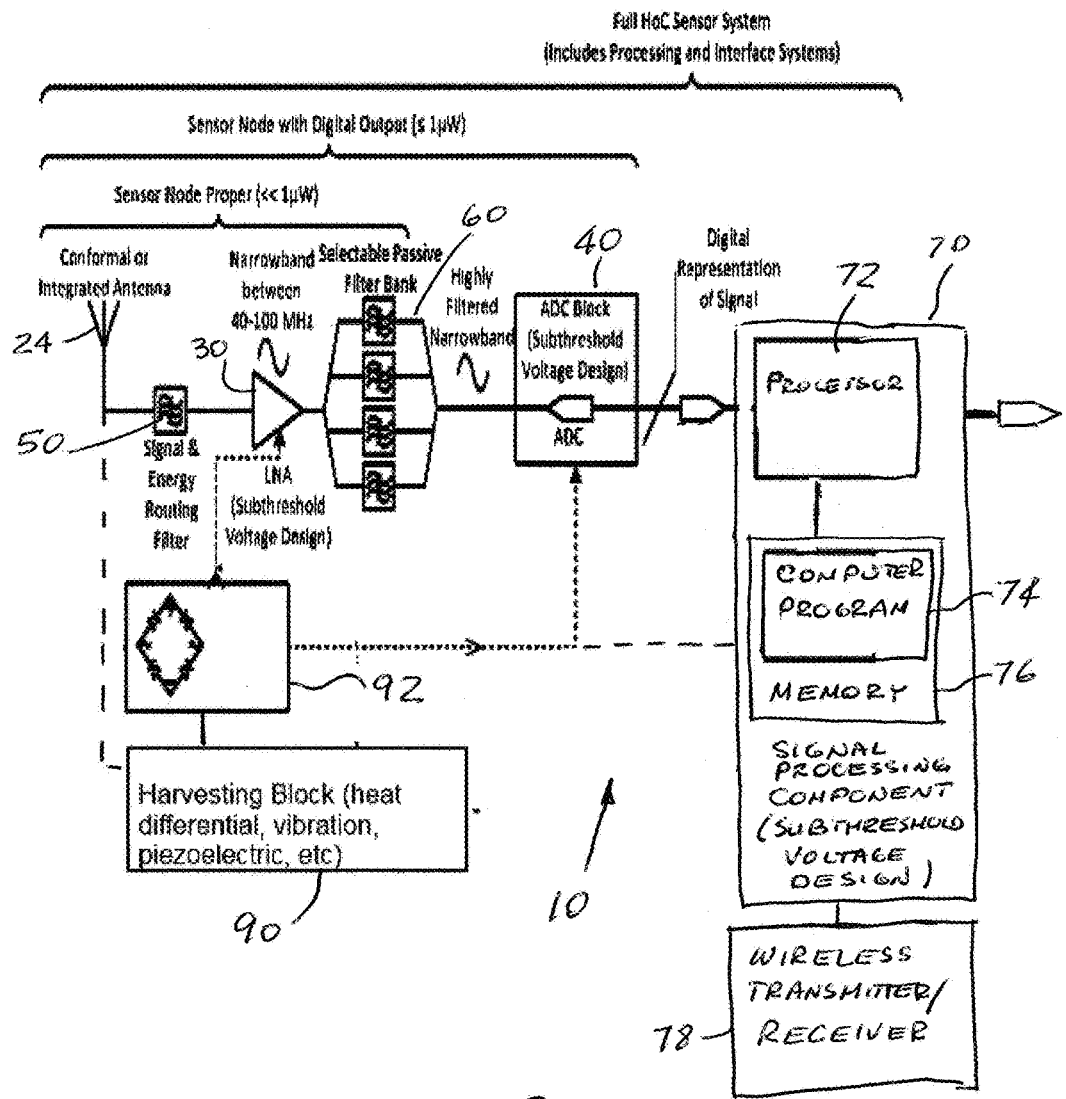
FIG. 6 illustrates a diagram of another exemplary embodiment of a RF field sensor.

FIG. 6 illustrates another exemplary circuit 20 that comprises the above described LNA 30, ADC 40, the filter 50 being disposed in a connection between the antenna 24 and LNA 30, the selectable filter bank 60 being disposed in a connection between the LNA 30 and ADC 40, and the above mentioned signal processing component 70.

For the sake of brevity, the above description of the filter 50, LNA 30, filter bank 60 and ADC 40 is omitted in the description of the exemplary sensor 10 of FIG. 6.

The signal processing component 70 may be a computer or a custom controller. In either form, the signal processing component 70 comprises one or more processors and non-transitory tangible computer readable medium and/or tangible computational medium 74 comprising algorithms and/or executable instructions (computer program code), that cause the one or more processors to process the signal defining the unabsorbed energy. The non-transitory tangible computer readable medium and/or tangible computational medium may be a computer program 74. There is also a non-transitory storage medium (memory) 76 that stores such computer program 74.

Tangible computer readable medium means any physical object or computer element that can store and/or execute computer instructions. Examples of tangible computer readable medium include, but not limited to, a compact disc (CD), digital versatile disc (DVD), blu-ray disc (BD), usb floppy drive, floppy disk, random access memory (RAM), read-only memory (ROM), erasable programmable read-only memory (EPROM), optical fiber, etc. It should be noted that the tangible computer readable medium may even be paper or other suitable medium in which the instructions can be electronically captured, such as optical scanning. Where optical scanning occurs, the instructions may be compiled, interpreted, or otherwise processed in a suitable manner, if necessary, and then stored in computer memory.

Alternatively, it may be a plugin or part of a software code that can be included in, or downloaded and installed into a computer application. As a plugin, it may be embeddable in any kind of computer document, such as a webpage, word document, pdf file, mp3 file, etc.

It is also contemplated to provide a historical data storage, by way of a non-transient storage medium to contain baseline emission signature profile(s). Historical data storage may be provided remotely from the sensor 10 or may be provided within the signal processing component 70.

Figure 7:
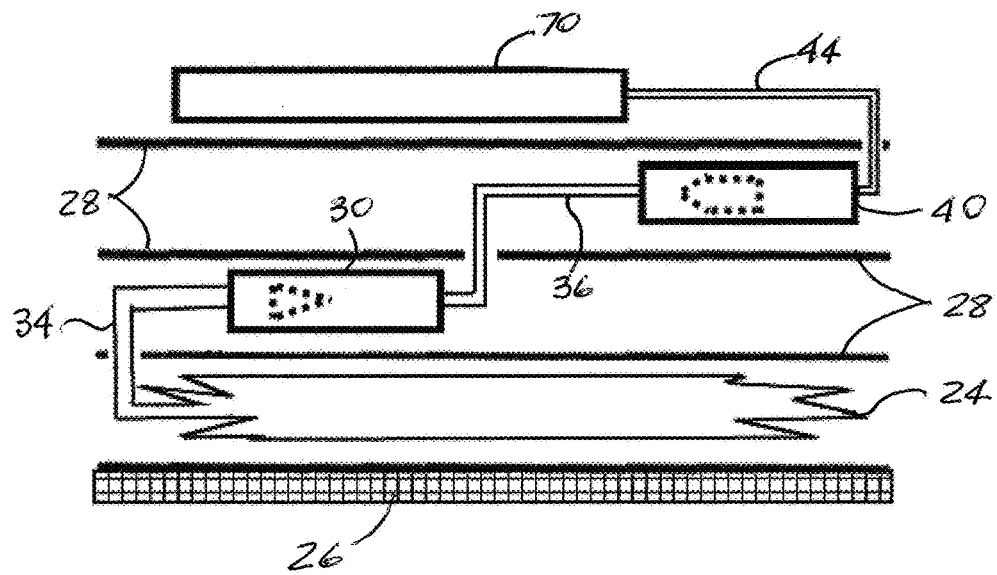
FIG. 7 illustrates a diagram of another exemplary embodiment of a RF field sensor.

FIG. 7 illustrates another exemplary circuit 20 comprising the antenna 24, LNA 30, ADC 40 and the signal processing component 70 that are disposed in layers with each other and are mounted on a die 26 that can be also in a protective layer 22. For the sake of brevity, the above description of the filter 50, LNA 30, filter bank 60, ADC 40 and signal processing component 70 is omitted in the description of the sensor 10 of FIG. 6.

Also specifically illustrated therein are shields 28 between each layer. Each shield 28 can be comprised of a conducting or non-conducting shield isolation material or a metallic or plastic type which can be of the same or different type between each layer. Shield(s) 28 can be also used with the exemplary sensor 10s of FIGS. 1-6.

The sensor 10 may also comprise a hollow enclosure 80 encasing any one of the exemplary circuits 20 of FIGS. 1-7. The sensor enclosure 80 is best illustrated in FIGS. 8-12. The sensor enclosure 80 may be of the type employed for conventional ICs or chips. The sensor 10 employing the enclosure is provided as a monolithic sensor 10.

When the sensor 10 is provided as a monolithic sensor 10 independent of the IC, the sensor 10 is configured as a system-on-chip (SoC) where the above described elements are mounted on the semiconducting die or chip. In one example, a compact SoC configuration can be provided with a surface are or footprint of less than 4 cm$^2$.

Any of the above described circuits 20 is mechanically fixed within the sensor enclosure 80 by any conventional practices, for example such as by way of an epoxy material, ceramic material, or plastic, which also defines a protective layer within the hollow enclosure.

When the sensor 10 comprises the enclosure, input and output connections to and from the antenna 24, LNA 30, ADC 40 and signal processing component 70 may be conventionally provided by pins 82 on the exterior edges of the sensor enclosure 80. The input and output connections may be also provided by a connector 84 accessible from the exterior of the sensor enclosure 80. The connections may be also provided by a combination of pins 82 and the connector 84.

In a further reference to FIGS. 8-12, the antenna 24 is illustrated as being disposed external to physical boundaries (envelope) of the sensor enclosure 80 or may be integrated into the sensor enclosure 80. When the antenna 24 is disposed external to physical boundaries (envelope) of the sensor enclosure 80, the antenna 24 may be attached to the exterior surface of the sensor enclosure 80 or may be disposed remotely, at a distance, from the exterior surface of the sensor enclosure 80.

In either form, the antenna 24 may be of any one including one of the conformal antenna, fractal antenna, dipole, capacitive coupled, inductive and ceramic dielectric resonant types. The antenna of the fractal type may be advantageous for its wideband frequency response and small size.

The circuit 20 may be positioned in any relationship relative to the shape of the antenna 24. FIGS. 8-12 also illustrate an example embodiment wherein the circuit 20 is offset from a theoretical center of the antenna 24. When the position of the circuit 20 is shifted (offset) relative to the centerline of the antenna 24, the sensor 10 is characterized by a lower overall noise or signal being sensed from the LNA 30 or ADC 40 if present as the degree of total inductive coupling is less. Although it is contemplated herewithin that centers or axis of the circuit 20 and antenna 24 can be aligned.

Furthermore, to enhance performance of the sensor 10, provide for ambient RF field measurement and increase acquisition of emissions of electromagnetic energy, the antenna 24 can be centered around the device 2 under test for signal pickup. For exemplary purposes, the device 2 is illustrated as the IC including a die 4 and an enclosure 6 with pins 8. The sensor 10 of any of the above described embodiments can be implemented in different configurations.

Figure 8:
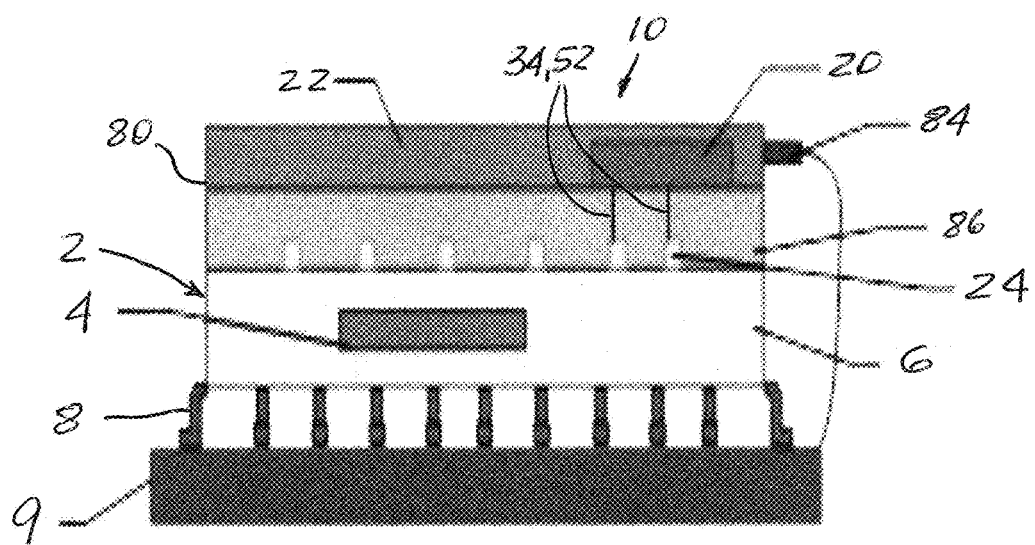
FIG. 8 illustrates an exemplary diagram of a sensor attached onto an IC with an adhesive.
Figure 9:
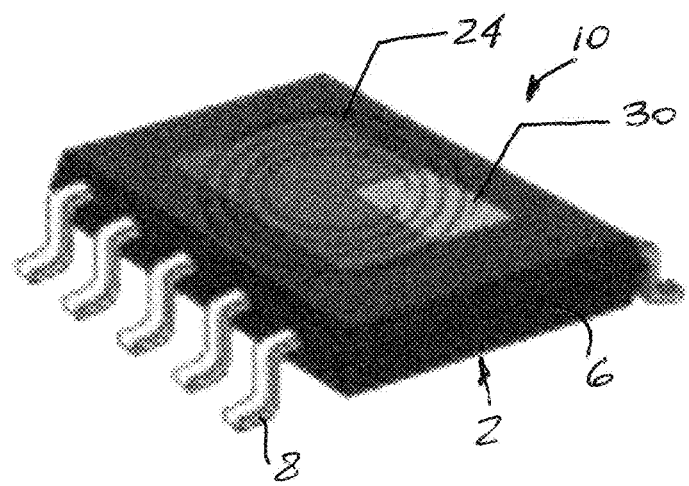
FIG. 9 illustrates a 3-D view of the sensor of FIG. 8.
Figure 10:
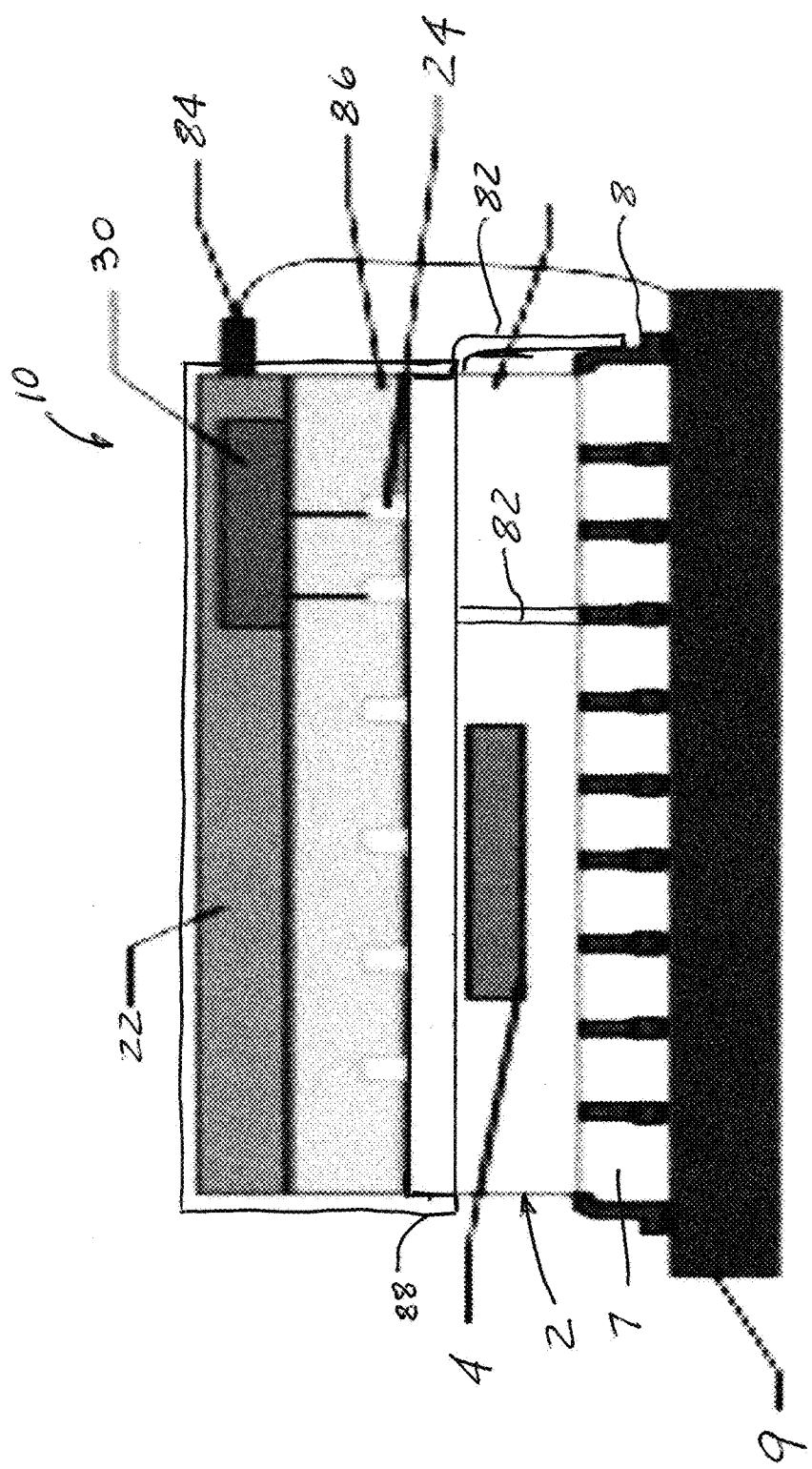
FIG. 10 illustrates an exemplary diagram of a sensor attached onto an IC with an adhesive.

FIGS. 8-9 illustrate one exemplary configuration, wherein the sensor 10 is attached to the exterior surface of an IC enclosure 6. In one example, the sensor 10 may also define a protective layer 22 at least containing the circuit 20 and can be attached with an adhesive layer 86 that may be further adapted to contain the antenna 24 external to the sensor enclosure 80. In another example of FIG. 10, the sensor enclosure 80 may be adapted with a skirt or a peripheral flange 88 sized and shaped to frictionally engage the enclosure of the IC in a manner that prevents unintended separation of the sensor 10 from the IC, particularly due to shock and/or vibration. In another example the sensor 10 may be positioned in a gap 7 between the IC and the surface of the PCB 9 in IC design and/or manufacturing processes utilizing such gaps 7. It is to be understood that adhesive 86 and/or skirt 88 provide a connection between the sensor 10 and the IC 2 of a permanent or temporary (releasable) type that is sufficient to prevent unintended separation of the sensor 10 from the IC 2.

When the sensor 10 is coupled to the IC either by way of an adhesive layer or peripheral flange, the connection to and from the circuit 20 can be provided by pin(s) 82 positioned, shaped and sized to touch respective pin(s) 8 of the IC 2.

The sensor 10 can have a foot print being substantially the same, except for tolerances, as the footprint of the IC 2. The sensor 10 may have a foot print being smaller or even lager, than the footprint of the IC 2.

Figure 11:
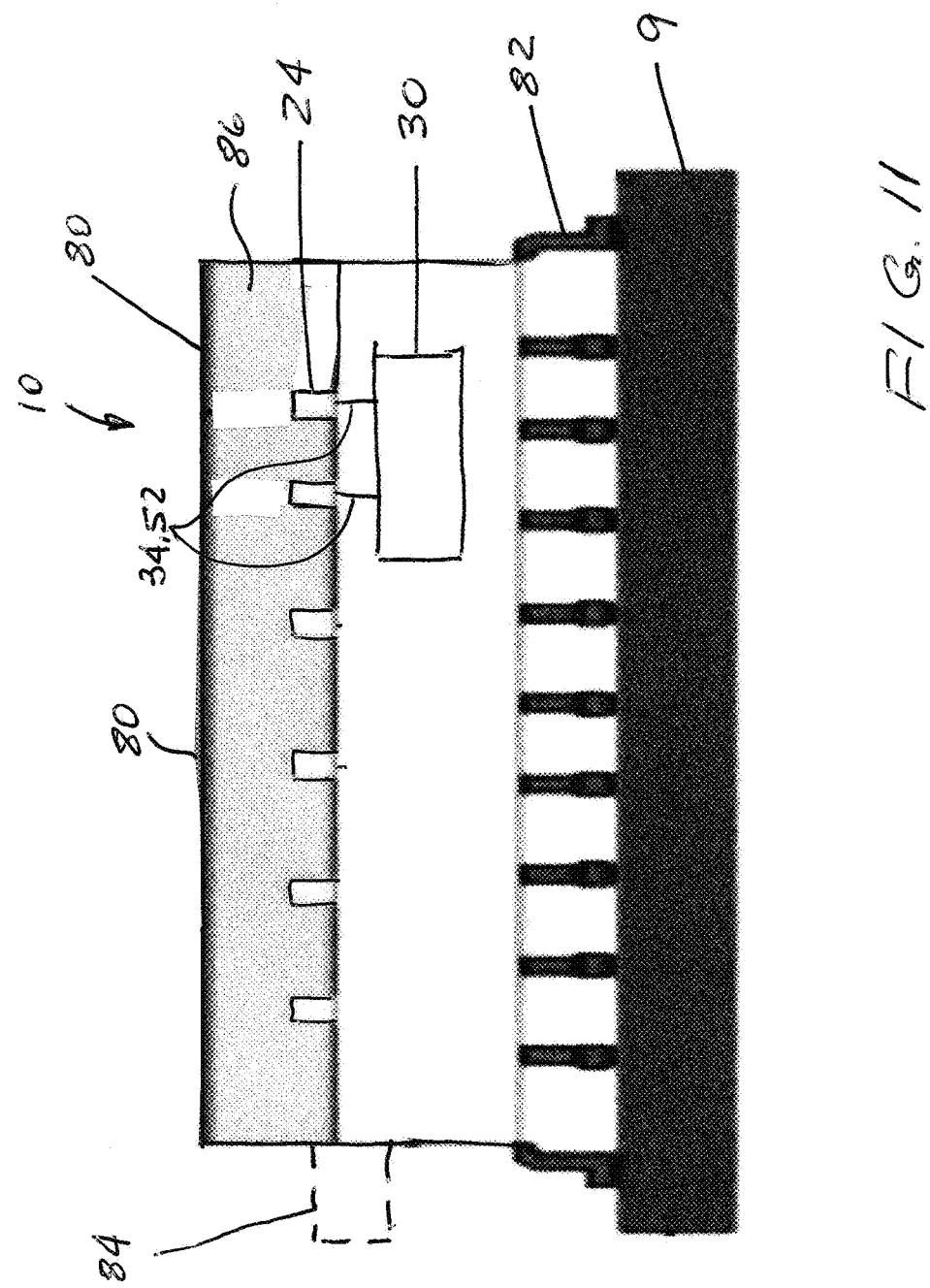
FIG. 11 illustrates an exemplary diagram of a sensor releaseably attached onto an IC.

FIG. 11 illustrates another exemplary configuration, wherein the sensor 10 is adapted with one or more pins 82 to connect the sensor 10 to a printed circuit board (PCB) 9. In one example, the sensor 10 is configured for integration onto existing, already manufactured boards with minimal board redesign or modification. For example, the pins 82 of the sensor 10 may be configured to mate with an existing socket, through hole pattern or surface mount pin pattern of the PCB 9.

FIGS. 8-11 further illustrate a packaging solution for the sensor 10 (e.g. plastic flat pack, metallized lid pack, flip chip, direct die bonding, etc.). The packaging solution is optimally evaluated based on their ruggedization (ability to withstand expected acceleration, vibration, and temperature environments), thermal management, die orientation effects, ability to attenuate any electro-magnetic interference (EMI) produced by the sensor components, and ability to harvest power from the surroundings. The sensor 10 may be made with the SoC die produced by the Metal Oxide Semiconductor Implementation Service (MOSIS) and/or XFAB.

In an exemplary embodiment, the sensor 10 may comprise a standard CMOS-compatible process performed using MOSIS and/or XFAB in conjunction with additional steps for custom ruggedized packaging and deposition of the conformal fractal antenna 24.

The design of the total die size of the sensor 10 can be based on included components and the necessary manufacturing process stages. Detection and analysis of the ultra-low power RF fields emitted from electronic devices (characteristic EMI signatures) can be performed for identification, differentiation, diagnostics, and prediction. IC tamper detection capability necessarily involves detection of changing of the internal circuitry of the target IC; even exposing circuits 20 using de-encapsulation techniques changes local trace impedances. These changes manifest as subtle changes to the unintended RF emission signature of the device. Detection of malicious tampering events is accelerated based on signature changes to provide constant protection of critical ICs utilizing a combination of advanced antenna 24, receiver, and signal processing technology driven by signal characterization algorithms for the detection and identification of malicious tampering that could occur in small electronic devices.

In an exemplary embodiment, a SiP miniaturization of the sensor 10 can be achieved for anti-tamper applications.

Figure 12:
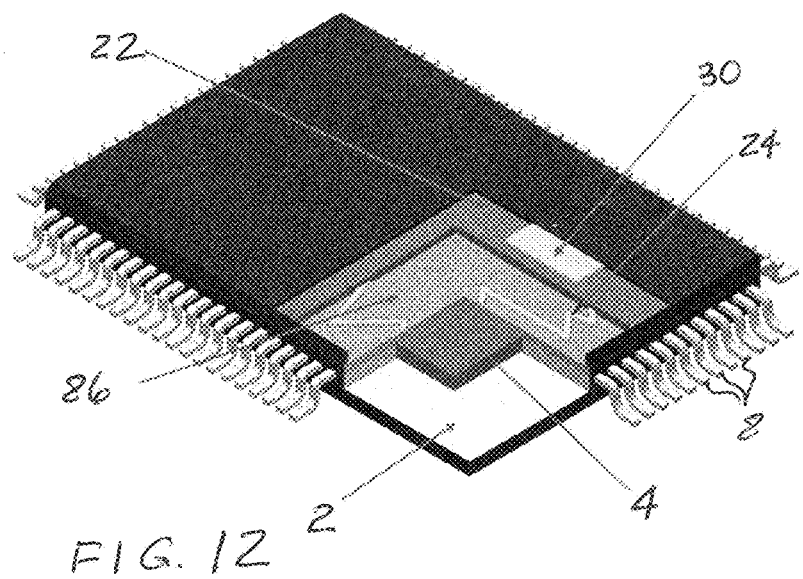
FIG. 12 illustrates an exemplary diagram of a sensor integrated into a PCB.

FIG. 12 illustrates another exemplary configuration, wherein the sensor 10 is integrated into the IC enclosure 6, which may be advantageous for originally manufactured ICs 2. The antenna 24 may be disposed integral with the IC enclosure 6 or may be attached to and disposed on the exterior surface of the IC enclosure 6. When the sensor 10 is integrated into the IC enclosure 6 in a different plane level than the die 4 of the IC 2, the circuit 20 is offset from a center of the IC 2.

Figure 13:
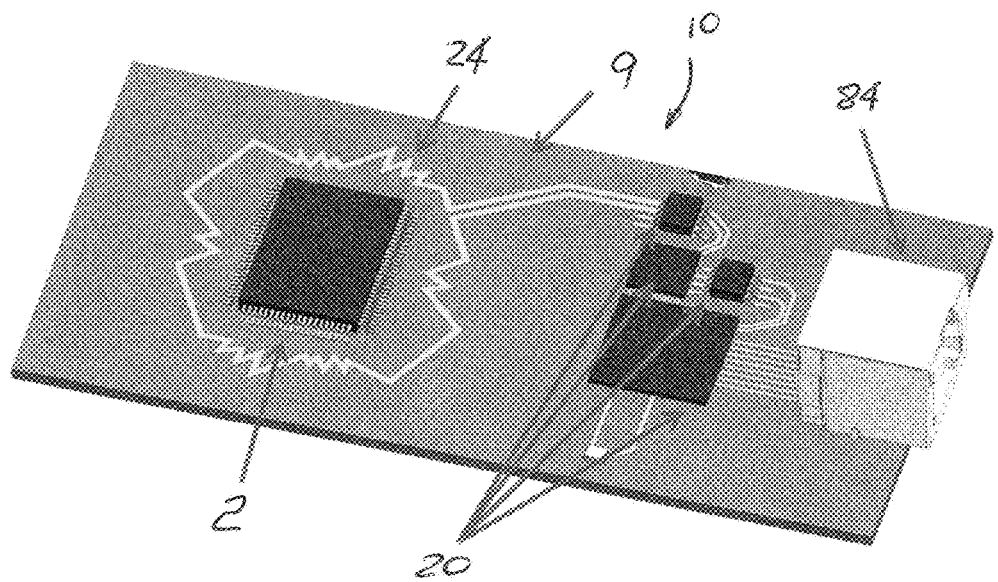
FIG. 13 illustrates an exemplary diagram of a sensor installed onto a PCB.

FIG. 13 illustrates another exemplary configuration, wherein the sensor 10 is configured for attachment of components to a printed circuit board (PCB), for example by way of soldering or through the socket. The PCB 9 may be the same board containing the IC or may be a "daughter" PCB that can be either coupled to the PCB 9 containing the IC 2 or disposed remotely therefrom.

The sensor 10 can be integrated into a PCB, where the antenna 24(s) can be integrated on or around the components present on the PCB or on the device to be monitored. The signal processing functions can include standard libraries for signal acquisition, digital signal processing (DSP), and algorithmic analyses. The sensor 10 of FIG. 13 can be constructed with any one of Commercial-Off-The-Shelf (COTS), military grade electronics and any combination thereof.

In any of the above described exemplary embodiments, the source of electric energy can be provided by different means. In one example, the source of electric energy may be provided as a battery (not shown) disposed either internally or externally to the sensor enclosure 80. In another example, the source of the electric energy 90 may be further provided by the above described coupling of the pin(s) 82 from the sensor enclosure 80 and the pin(s) 8 of the IC 2. In another example, the source of the electric energy may be provided as an energy harvesting source 90, best illustrated in FIG. 6. The energy harvesting source 90 exploits ambient energy sources such as vibration, heat, and electromagnetic fields. In another exemplary embodiment, architectures and components of LNA 30, ADC 40 and optional filter 50, filter bank 60, signal processing component 70 and even the source of the electric energy may be provided as an IC of either one of the semiconductor IC type and thin-film IC type. The energy harvesting source 90 may be connected to an AC-to DC converter 92, for example such as a rectifier bridge of FIG. 6.

The sensor 10, of any one of the above described embodiments, may be configured to require, during operation, an aggregate power draw of less than 1 μW and even below 0.50 μW, while maintaining sufficient RF field sensitivity to support security, authentication, and monitoring functionality.

When sensor 10 is configured to achieve these low power requirements, the design of the sensor 10 can leverage an ultra-low power design architecture that can bring the energy consumption of the sensor 10 down to the point where energy harvesting becomes a reasonable option to subsidize the power drawn from the existing IC, board, system or subsystem using the available power and ground PCB traces or power and ground pins connected to the host device and powering it. The sensor 10 can employ subthreshold circuit topologies and design techniques throughout the active semiconductor components of the sensor circuit 20, that is the LNA 30, ADC 40, and signal processing component 70 to drastically reduce intrinsic power requirements.

Lower power draw may be coupled with energy harvesting in the spectral regions outside the narrow signal band of interest. Additionally, the sensor 10 of any one of the above described embodiments can utilize smaller circuit node sizes (as low as 90 nm) than those typically employed in low power RF sensors 10 to further reduce power draw without sacrificing sensitivity.

In one exemplary embodiment, the sensor 10 may employ MOSFETS in one or more circuit components, particularly MOSFETS manufactured using low power MOSFET circuit topologies and more particularly such as those that utilize subthreshold circuit 20 (transistor) design to address power requirements. These methods may be implemented using standard CMOS processing techniques for components that comprise the RF sensor 10 proper, including the active LNA 30 and energy-harvesting block. Other sensor 10 components, such as the ADC 40 and digital signal processing component 70, may employ subthreshold design to minimize overall power draw and even disable operation of the sensor 10 when the available power is below the threshold.

Figure 14:
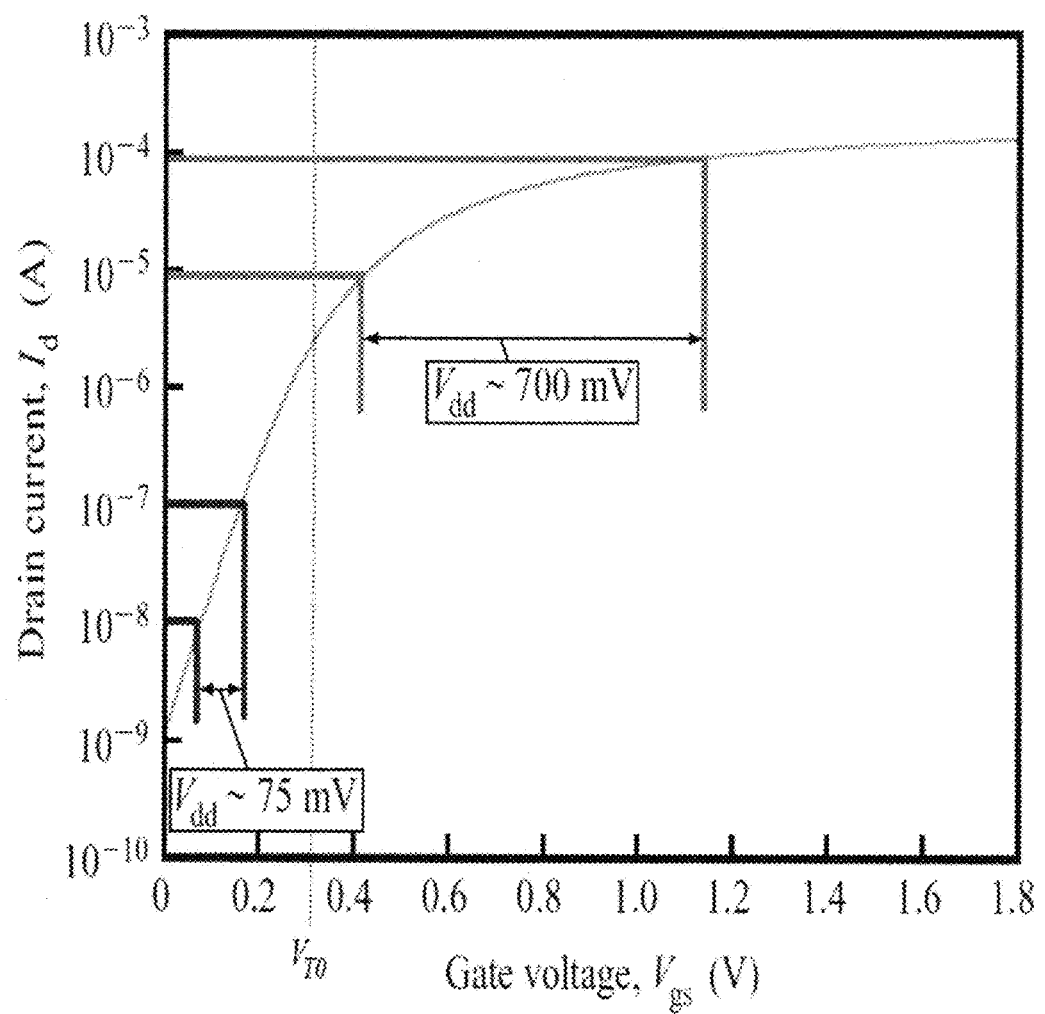
FIG. 14 illustrates a comparison of Subthreshold and Superthreshold region I-V responses.

Subthreshold circuit design refers to using a drain voltage that is below the full inversion threshold, i.e., $V_{DD}$ is much lower and in the region where the transconductive behavior (i.e., induced charge/carrier density) of the MOSFET is dominated by the gate channel being weakly inverted. As is best shown in FIG. 14, this results in a drain current that increases exponentially (rather than quadratically, as in the strongly inverted FET) with respect to linear changes in the gate/source voltage ($V_{GS}$), where the logarithmic vertical scale and that $V_{T0}$ represents the threshold voltage).

Similar to the strong inversion region, the sensor 10 can employ a relationship between change in gate voltage and current amplification, allowing for the design of amplifying and logic circuits 20. These circuits 20, however, have significantly reduced current requirements as well as driving voltages/voltage swings allowing for ultra-low power consumption. (E.g., an op-amp draw of 75 nW in well-designed subthreshold topologies versus 75 μW in strong-inversion/super-threshold topologies.)

As another benefit, use of subthreshold circuit 20 elements allows the sensor 10 to be characterized by very low power circuit topologies, under 50 microwatts, with scalable power-frequency performance. Both voltage-mode and current-mode circuit topologies can be considered herein, as each has benefits that characterize their power-frequency scalability, which can be used for power management purposes. For example, in the subthreshold regime (i.e., the exponential I-V region of MOS transistors) current-mode approaches provide the possibility to scale bias currents in a very wide range while the bias voltages are changing proportional to logarithm of current.

In another exemplary embodiment, energy harvesting can Offset Intrinsic Power Consumption of the ADC 40. The sensor node or front end of the sensor 10, that as was mentioned above may refer to a combination of antenna 24 and LNA 30 (but that may be also considered as a combination of antenna 24, LNA 30 and ADC 40) can have an intrinsic power draw far below 1 μW; however, the addition of the ADC 40 block can require additional power consumption. Depending on the resolution and sampling speed required, power consumption may typically vary from 4 μW to 25 μW, with sampling rates ranging from 40 megasamples/second (MS/s) to 100 MS/s, and resolutions of 8-12 bits. The sensor 10 may be configured to require a power draw of 35-40 μW for a 14 bit ADC 40 at 125 MS/sec if the ADC 40 is implemented using a Subthreshold, Source Coupled Circuit 20 Topology with a scalable folding and interpolating ADC 40. Such a component is useful to retain the signal resolution required for anti-tamper and monitoring operations.

The various subthreshold design-based components within the circuit 20 can be characterized by exemplary values in Table 1.

TABLE 1

Power vs. Sampling Speed and resolution using Subthreshold ADC 40 design with different

| Power | Sampling Rate | Resolution | MOSFET related Circuit 20 Technology & Topology |
|---|---|---|---|
| 4 μW | 80 MS/s | 8 bits | Subthreshold, Source Coupled |
| 20 μW | 40 MS/s | 8 bits | Subthreshold, Standard CMOS |

TABLE 1-continued

Power vs. Sampling Speed and resolution using Subthreshold ADC 40 design with different

| Power | Sampling Rate | Resolution | MOSFET related Circuit 20 Technology & Topology |
|---|---|---|---|
| 25 μW | 100 MS/s | 12 bits | Subthreshold, Standard CMOS |

The power consumption required for the sensor node and ADC 40 can be readily offset by energy harvesting/scavenging. Considerable RF energy can be harvested from frequency bands outside the range of interest. Complex ICs show rich emission phenomenology (corresponding to capturable radiated energy) throughout the 30 MHz-3 GHz spectral region. In addition, vibration, thermal gradients, etc., which are intrinsic to typical board operation, could be used as alternate energy harvesting sources if the expected RF energy harvesting levels are not sufficient to power the sensor node. Error! Reference source not found. Table 2 shows the expected power density that can be harvested from alternative ambient power sources under a variety of environmental conditions.

TABLE 2

Exemplary energy harvesting capabilities

| Technology | Power Density (μW/cm$^2$) |
|---|---|
| Vibration - electromagnetic | 4.0 |
| Vibration - piezoelectric | 500 |
| Vibration - electrostatic | 3.8 |
| Thermoelectric (5° C. difference) | 60 |

Figure 15:
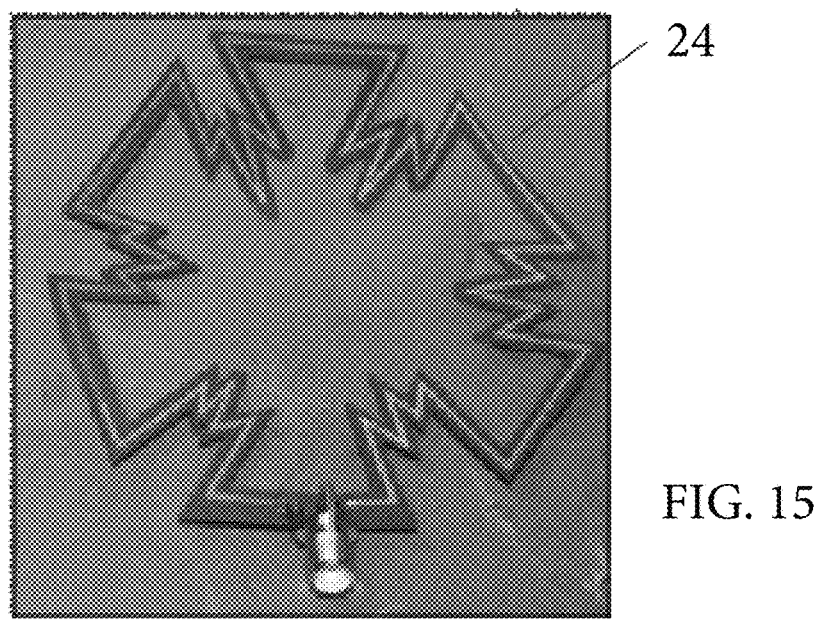
FIG. 15 illustrates an exemplary antenna configuration.

One or more conformal antennas 24 can be provided within a target area of 1 cm$^2$ that maximizes performance typically in the 40 MHz-100 MHz frequency range. One or more conformal antennas 24 can be of a Fractal-like antenna type(s), which can achieve broadband and low frequency performance in space-constrained environments. This may be advantageous not only to receiving signals, but also to ensure that energy harvesting can occur over the largest possible bandwidth. An Ansoft High Frequency Structural Simulator (HFSS) software can be employed to simulate the performance of baseline designs for both signal as well as broadband power capture to harvest energy. Exemplary antenna 24 that can be used for measuring RF fields produced by active FPGAs is shown in FIG. 15.

One or more conformal antennas 24 can be of antenna designs with performance profiles on a polyimide substrate using a conventional photolithography approach. Following manufacture, antenna performance may be assessed through measurement of the $S_{11}$ parameter over the frequency range of interest on a network analyzer. Resulting antennas 24 may then be used in conjunction with the implementation of the RF field sensor 10. An active LNA 30, whose input impedance is matched to the output impedance of the conformal antenna 24, may be used. Conformal antennas 24 exhibit an inverse relationship between their size and characteristic impedance (e.g. as size is reduced, characteristic antenna impedance is increased), and thus the typical standard 50Ω RF LNA 30 input impedance would reduce the sensor node's efficiency with deleterious effects on both sensitivity as well as power consumption. To account for this, LNA 30 design typically occurs in parallel with antenna design.

Similar circuits 20 (Field Effect Transistor (FET) followers, etc.) may be designed to operate at power consumptions significantly under 1 µW. It is optimal to match the impedance of the energy-harvesting block to the antenna 24s' characteristic impedance.

As was mentioned above, sensor 10 can comprise hardware components, including a LNA 30, ADC 40, customized DSP and processing IP blocks, conformal antenna 24, and energy harvesting components 90, 92. Components selected for hardware design incorporate a SoC floor plan for a model cell library and routing schematic for appropriately connected internal components. Conformal antenna placement (e.g. on top of the die package, around its perimeter or inside the die package) can be designed to maximize sensitivity to ambient RF fields from protected ICs. Many of the components described in the disclosed embodiments may be implemented as modules. The sensor 10 and, more particularly, the signal processing component 70 may incorporate a number of software modules for typical system functionality, including signal processing, hardware scheduling, power management, algorithmic analyses, and result reporting modules.

A module is defined here as an isolatable element that performs a defined function and has a defined interface to other elements. The modules described in this disclosure may be implemented in hardware, software in combination with hardware, firmware, wetware (i.e. hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

Sensor architecture can be streamlined to minimize complexity. Analog filtering can be more stringent, eliminating the dependency on high-frequency analog down-conversion in the RF front end, as well as the need for a digital down-conversion block in the processing section. Simplification of the system architecture can limit the usable signal bandwidth to that specified as the frequency range of interest, further minimizing size, weight, and power requirements for the sensor 10. Alternatively, an analog down-conversion tuning means may be added if the power requirements mandate added power reduction.

Figure 16:
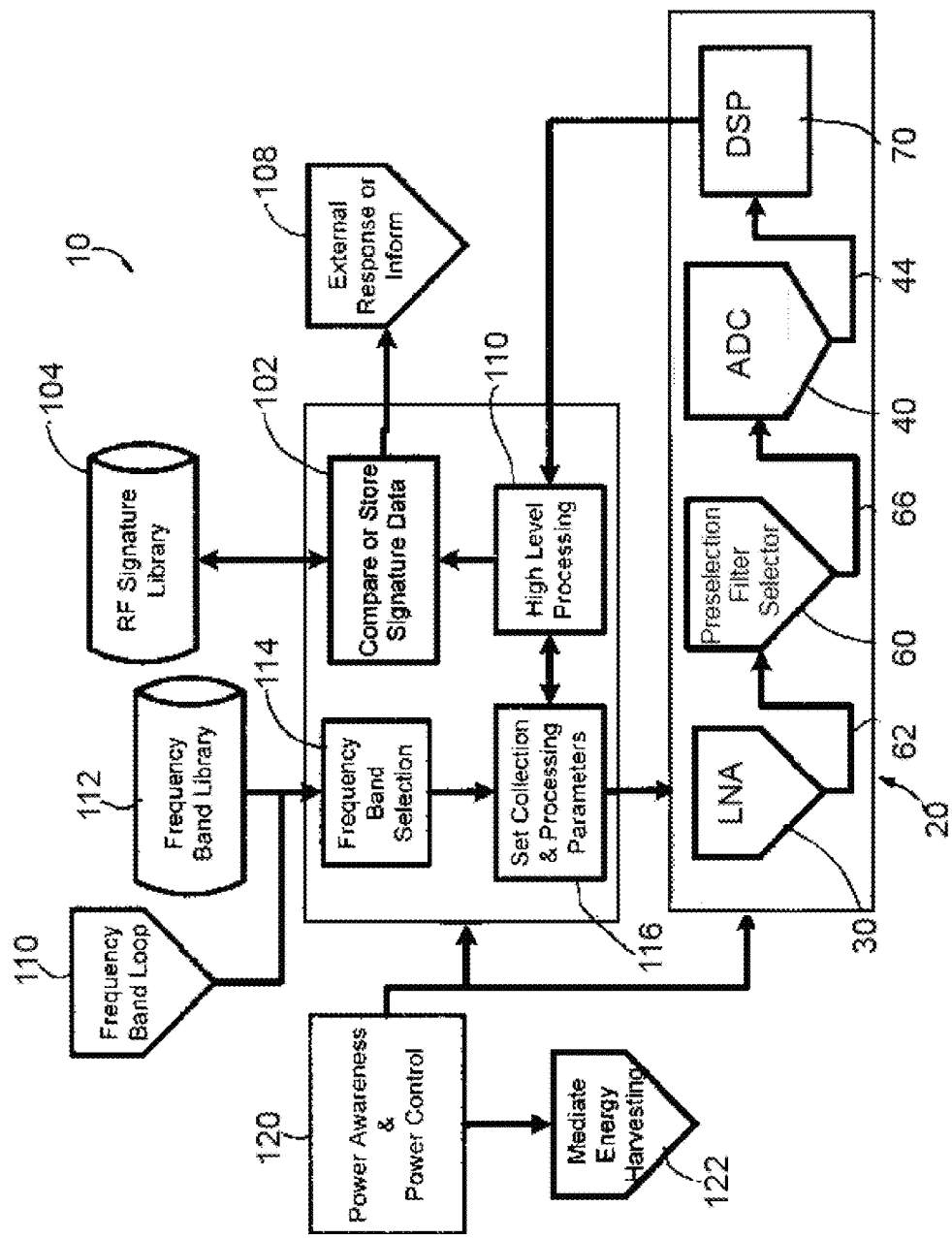
FIG. 16 illustrates an exemplary block diagram of data flow and signal processing component (control module) interface depicting the software design architecture.

Operation of the sensor 10 can be further illustrated in a combination with FIGS. 16-20. FIG. 16 illustrates an exemplary block diagram of the computer-implemented method(s) that can be performed by any of the above described sensors. The signal processing component or DSP 70 can be either integrated into the sensor or disposed remotely therefrom by wireless or wired connection(s). High Level Processing 100 may direct the Set Collection and Processing Parameters 116 to prepare and tune the circuit 20 to the settings and frequency band to be examined. This can include use of inputs from the Power Awareness and Power Control 120 to determine if sufficient power is yet available to power the Sensor Section 20. The Power Awareness and Power Control 120 may also send a message to the Mediate Energy Harvesting 122 to Stop or Initiate energy harvesting if too much or too little power is available respectively. If insufficient power is available, the High Level Processing 100 will wait until sufficient power is available to perform the Set Collection and Processing Parameters 116 which turns on power and prepares the circuit 20. Other control operations or actions which may be sent to circuit 20 can include selecting the Preselection Filter Selection 60, setting the ADC 40 at a specific acquisition clock rate and specific number of ENOB depending on power available, aligning operation of the DSP 70 based on the ADC 40 settings and Preselection Filter Selection 60 settings. For example, the above actions enable the operation of the sensor 10 using minimum power by using a corresponding number of bits in its processor and calculations based on the ENOB chosen previously, or choosing different FFT size based on Preselection Filter Bandwidth or other characteristics. The High Level Processing 100 may direct the Compare or Store Signature Data 102 to acquire exemplary signature patterns from the RF Signature Library 104 and prepare to compare the exemplary signature pattern of the currently received and processed signal in the circuit 20 with the exemplary signature pattern. When the comparison is completed, the results can be sent to External Response or Inform 108 operation to perform the desired actions such as informing a user of mismatch, sending an electronic message or signal to an anomaly logging system, storing the event in non-volatile internal memory, or sending a signal to disable the device being monitored. The Frequency Band Loop 110 generator may simply generate a request for the nTH Frequency Band from the Frequency Band Library 112, creating a specific Frequency Band Selection 114 to be a basis for the acquisition and processing. Within the circuit 20, the antenna 24 connected to the LNA 30 provides the low-level unintended RF emissions from the device 2 under monitoring. The amplified unintended RF emissions signals output from the LNA 30 may be sent to the Preselection Filters 62 (filter bank 60) selected for removal of possible high strength unneeded signals adjacent the desired signals to be examined. Without the filter bank 60, possible high strength unneeded signals adjacent the desired signals to be examined may saturate or clip the inputs into the ADC 40 causing frequency leakage noise which may obscure the lower level signals to be scrutinized, thus the filter bank 60 may be needed, depending on the knowledge of the designer and/or specific application. The digitized signals from filter bank 60, representing the analog signals input to the ADC 40 are sent to the DSP 70 for a variety of possible operations to further isolate, extract, or transform the digital representation of the signals into a form useful for comparison with the signature selected and then compared in 102.

Figure 17:
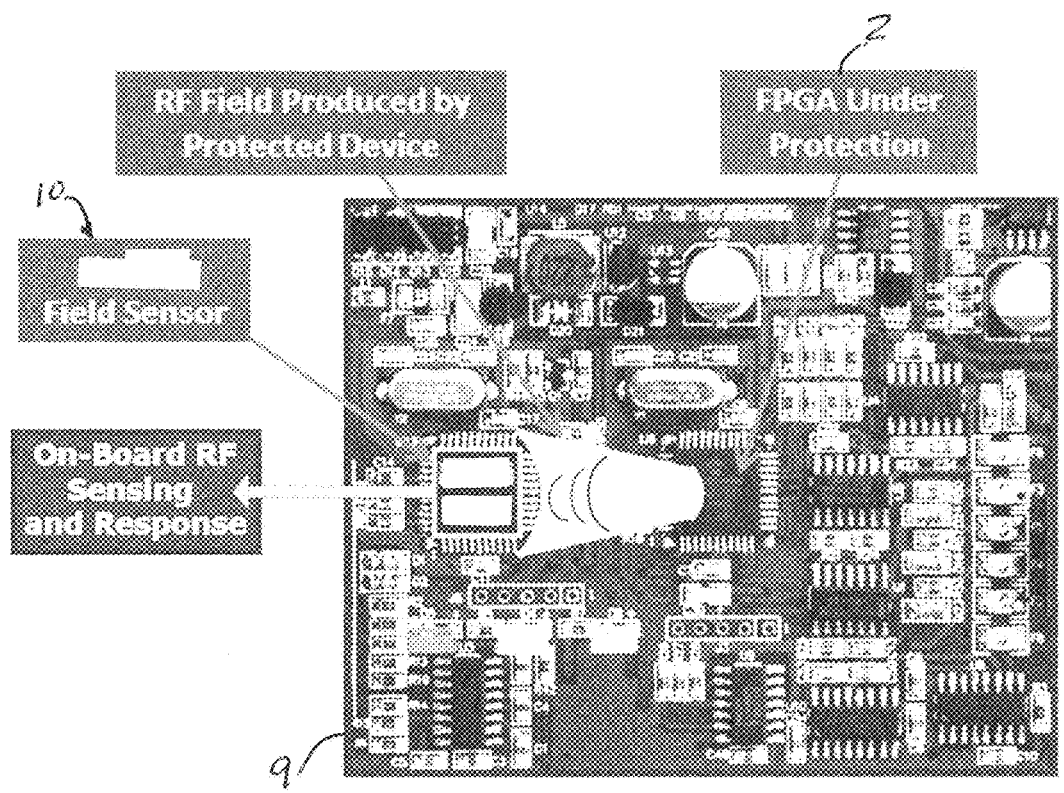
FIG. 17 illustrates application of the sensor in protecting FPGA installed on a PCB.

FIG. 17 illustrates an exemplary PCB 9 employing IC 2 of the FPGA type under any one of test, inspection, observation monitoring and protection. The sensor 10 is illustrated as mounted onto PCB 9 and operable to collect and process emissions of RF energy from IC 2 being an FPGA when being powered. The emissions of RF energy are collected at the antenna 24, amplified at LNA 30, converted into a digital form at ADC 40 and processed at the signal processing component 70. High level signal processing 100 essentially comprises analyzing signature of the emission and comparing such analyzed signature at 102 with the baseline or previous signatures stored in the signature library 104 that can reside in memory 76. There could also be a connection with the external response or inform 108.

Exemplary FIGS. 18A and 18B illustrate that signature of the FPGA with altered ring oscillator can exhibit additional peaks 130 in a frequency region 132. Exemplary FIGS. 19A and 19B illustrate that signature of the FPGA with modified programming can exhibit loss of peaks 134 in frequency regions 136. Based on analyzed signature, the sensor 10 can determine one of state and condition of the FPGA.

Analysis of RF energy perturbations may be used to detect sudden changes in emission peak patterns, pattern locations or signatures indicative of system and/or IC tamper. Analysis of RF energy perturbations may be also used to detect Transitional emission patterns such as added phase noise or a higher noise floor changes indicative of system and/or IC aging detection of any sudden and unexpected change in IC emissions may be configured to trigger an alarm. Should the system under test be shut down for transport, maintenance, or storage, the sensor 10 may check the ambient RF field at the next startup against the previously recorded baseline to determine whether tamper or counterfeiting has occurred while the system lay dormant. Detection of aged parts may trigger assessment of IC Remaining Useful Life (RUL). Perturbations in ambient RF field surrounding devices can identify an aged device, such as the IC 2. The sensor 10 can be therefor configured to monitor the electronic health and RUL of industrial and commercial electronics based solely on their intended or unintended emissions and to identify emission signature elements associated with circuit 20 changes upon device aging. Any RUL prediction that falls below board specifications may trigger an alarm that may inform the responsible party that the system is not operationally-ready.

Sensor memory may only be clearable by an authorized party with the appropriate encryption key to access internal device functionality. In addition to protected IC status, the RF field sensor 10 may also be configured to record and report raw field data for custom analyses.

The detection (receiving, extraction of signals above or within the noise floor, and signature processing) of extremely low-power emissions (achieving −172 dBm sensitivity is possible) enables highly accurate assessments of IC status and integrity by revealing additional information in the additional lower power details contained in emission spectrum for algorithmic assessment. High sensitivity to RF field perturbations can be used to detect tampered FPGAs with altered programming or circuitry. The sensor 10 modifies the required design space by including size, integration, and power consumption as constraints upon specified functionality. Ambient RF field detection can take place using a conformal antenna 24 designed for the 40 MHz-100 MHz range. Subsequent amplification and filtering of the analog signal may utilize an ultra-low-power LNA 30 followed by a series of software-controlled, hardware-defined pre-selection filters to eliminate signals outside frequency ranges of interest. An ultra-low power ADC 40 may directly digitize the resulting filtered analog signal. Under-sampling assists in the reduction of power (by allowing for slower ADC 40 rates and corresponding decreases of power consumption of >50%), while simultaneously generating near-baseband aliases of the narrower band of interest for processing. The resulting digital signal can be processed using customized IP cores and GPP resources with results sent to a user, used to disable a defective, tampered, compromised, or out-of-specification device, encrypted into storage, and/or compared with the recorded data.

Additionally, the subject matter can practice methods taught in documents incorporated by reference herein.

Figure 20:
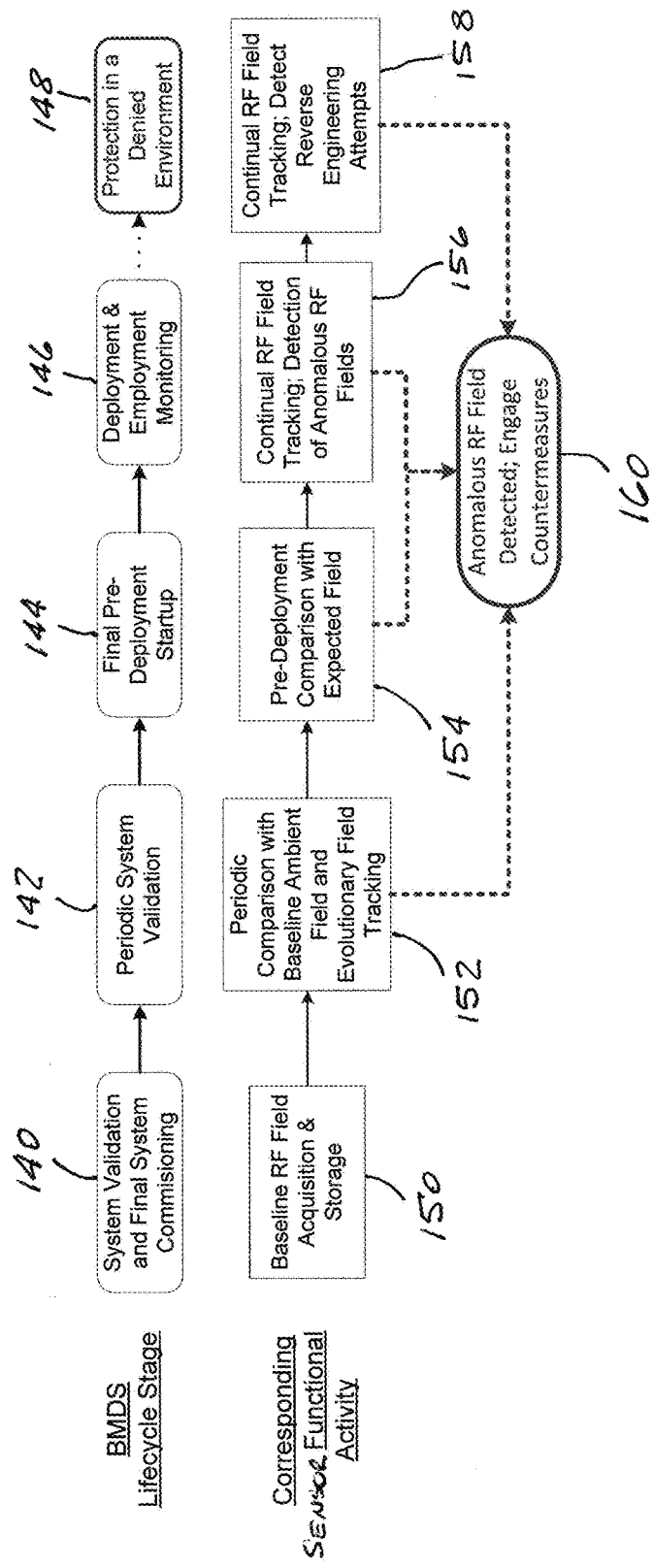
FIG. 20 illustrates an exemplary correlation between BMDS Lifecycle Stage and corresponding functional actions (activity) by the sensor.

FIG. 20 illustrates an exemplary correlation between Basic Malware Detection System (BMDS) Lifecycle Stage and corresponding functional actions (activity) by the sensor 10. The BDMS Lifecycle Stage illustrates the steps that can be taken to implement the sensor(s) into a system requiring monitoring of its processing resources for the presence of malware or other anomalous hardware, firmware or software into the device being monitored, further relating to malicious software, anomalous software, modified software, malicious firmware, anomalous firmware, modified firmware, malicious circuitry, anomalous circuitry and modified circuitry within the one or more electrical devices. The System Validation and Final System Commissioning step 140 typically performs the steps of identifying the device(s) to be monitored in a system, and the expected proper signatures to be received and processed from the devices, and/or alternatively the undesired improper signatures to be on the alert for, as indication of malware presence. This may include the frequency and filters selection, as well as the energy harvesting sophistication chosen and ADC digitization number of bits and clock speed.

The Periodic System Validation step 142 tests and verifies and validates the system specified in the previous step in a real world environment operating continuously for an extended test period of time. The Final Pre-Deployment Startup step 144 instantiates and duplicates the designed and tested configuration in the previous steps for preparation of real world implementation across a large number of systems.

The Deployment and Employment Monitoring step 146 places the devices in an active state and begins the active monitoring process, ensuring all emplaced active sensor systems are operating and configured in an effective and sufficiently sensitive manner, and no hardware faults or faulty connections exist for example.

The overall result of the preceding steps is a state of Protection in a Denied Environment 148.

The Corresponding Sensor Functional Activity exemplary steps associated with the above BMDS Lifecycle Stage can be as follows.

The Baseline RF Field Acquisition and Storage step 150 acquires exemplary identifying signatures by study and selection of the specific unintended emissions present and generated within the device under examination and to be monitored. The Periodic Comparison with Baseline Ambient Field and Evolutionary Field Tracking step 152 ensures the emissions and resulting signatures acquired are consistent over time, sufficient to perform the necessary continuous monitoring, for example, the examined device does not drift beyond expected emissions patterns, making comparison incorrect. The Pre-Deployment Comparison with Expected Field step 154 ensures the prototype configuration on a real device in a real world environmental setting functions correctly, that is the previous steps and frequency parameters and signatures used and performed in the design stage still apply in deployed equipment. The Continual RF Field Tracking: Detection of Anomalous RF Fields step 156 represents the real world implementation and operation of the sensors in the multiple systems to be monitored.

The Continual RF Field Tracking: Detect Reverse engineering Attempts step 158 can detect Reverse Engineering by monitoring for sudden dramatic changes in multiple inputs simultaneously such as signature changes and energy harvesting power increases or decreases. Any signal step or the combined steps can be operable to detect the event 160 of Anomalous RF Field Detected; Engage Countermeasures At a minimum, RF energy may be analyzed at commissioning, during successive power-ups, and prior to user activation. The sensor 10 can be adapted with SiP architecture to minimize power draw and package size while maximizing sensitivity in the 40-100 MHz frequency range.

In an exemplary embodiment, the sensor 10 can be configured as a low powered RF field sensor 10 detecting perturbations in ambient RF fields to ensure the integrity and monitor the health of critical ICs, particularly that of FPGAs when performing critical functionality.

In an exemplary embodiment, the sensor 10 can be configured to continuously monitor and secure critical ICs in fielded systems:

In an exemplary embodiment, the sensor 10 can be configured with a sensitivity to at least −170 dBm and may be configured to allow full exploitation of −135 dBm and weaker signals emitted from IC that are generally indicators of tamper, authenticity, and electronic health deficiencies of the IC.

In an exemplary embodiment, the sensor 10 can be tunable, but not limited to narrow frequency bands in the frequency range of interest (40-100 MHz)

Connected sensor nodes (front ends) may be implemented for performing signal acquisition and digitization drawing <1 μW of power to support continual use without disrupting normal operations or requiring a redesign of current system Size, Weight, and Power (SWaP) specifications, as opposed to an intrusive method such as an apparatus adjacent the monitored device and connected to its input and output signals, and monitoring for unexpected digital patterns.

In an exemplary embodiment, the sensor 10 is configured to withstand air travel, ground transport, storage, and maintenance (ruggedization against acceleration, vibrations, and high/low temperature ranges).

In an exemplary embodiment, the sensor 10 can comprise a customized compressed fractal type conformal antenna 24 design for optimum gain over 40-100 MHz.

In an exemplary embodiment, the sensor 10 can be configured to comprise a sub-threshold Ultra-low-power LNA 30 for increased RF sensitivity without requiring significant power draw; a filter bank 60 is employed to select specific frequency bands between 40-100 MHz and to reduce possible clipping or saturation from unwanted, unneeded high amplitude signals in adjacent bands; a low power ADC 40 with sufficient bits to preserve sensitivity to small field perturbations, estimated at 10 Effective Number of Bits (ENOB) so as to further reduce power draw and noise emission; an ultra-low power Digital Signal Processing (DSP) chain of logic gates for performing signal processing functions such as simultaneous multiply and accumulate operations and analysis for additional emission detail analysis and reduced noise emission; a power-self-aware General Purpose Processor (GPP), that can be configured to sense available power levels from the energy harvesting component for frequency downconversion scheduling or filter switching and communication of results for and reduced processor loading while less power is available to the sensor 10 system to maintain system operation, although at a slower sample processing rate due to lower power availability; an internal encrypted memory for storage of baseline ambient RF signals for added security and tamper resistance; output ports for control over protected devices and/or reporting to an external user interface for status communication or device disablement if unwanted operation or tampering is detected or suspected.

In an exemplary embodiment, the sensor 10 is provided as an RF field sensor 10, including hardware, software, electronic die, packaging, and manufacturing elements.

In an exemplary embodiment, the sensor 10 comprises a designed typically fractal conformal antenna 24 sized and shaped to fit the device's dimensions and to maximize gain in the 40-100 MHz region while remaining within geometric space constraints of the IC.

In an exemplary embodiment, the sensor 10 achieves an ADC 40 Effective Number of Bits (ENOB) of 10 or greater.

In an exemplary embodiment, the sensor 10 employs tunable frequency range for tailored narrowband analyses.

In an exemplary embodiment, the sensor 10 is configured with power management compatibility to be active only when powered by motion/vibration energy harvesting and/or to use external power when needed.

In an exemplary embodiment, the sensor 10 is configured to operate when there is a sufficient power from any source is available. For example, a capacitor can be used Sensitivity to lower voltages associated with energy harvesting circuitry when sufficient energy is unavailable form its harvesting activity and/or other sources are unavailable In an exemplary embodiment, the sensor 10 uses limited, reduced or ultra-low power draw means to prepare, process, and algorithmically analyze unintended emissions, achieving this through a variety of means including subthreshold circuit design and operation.

In an exemplary embodiment, the sensor 10 includes energy harvesting means to reduce power requirements either to provide or supplement its required circuitry power, especially at the noise sensitive, size constrained, heat constrained and critical antenna 24 and LNA 30 sensor end of the system.

In an exemplary embodiment, the sensor 10 provides a means to reduce or eliminate power lines and space and added complexity from such lines running to or from the sensor 10 end of the analyzing system.

In an exemplary embodiment, the sensor 10 provides a simpler, easier and smaller facility for retrofit of a validation system onto existing chips and circuit 20 board assemblies.

In an exemplary embodiment, the sensor 10 provides a means to analyze operation of processing devices without extensive design considerations being required.

In an exemplary embodiment, the sensor 10 is configured so as to not require a priori knowledge of the detailed operation of the chips it is verifying. The internal operations of the examined chip remain as a 'black box' to the analysis system, and successful and accurate ongoing continuous scrutiny and verification can be achieved without any additional operating information, maintaining security and secrecy of the examined chip's operation while operating, as well as eliminating engineering design time considerations of the device under test.

In an exemplary embodiment, the sensor 10 is configured to use the lower voltage levels, that may be associated with energy harvesting, to operate its subthreshold design circuitry.

The considered trade space balances sensitivity, power consumption, and size (footprint within the SoC). Where necessary, the invention typically has multiple components to ensure that the design includes more stringent analog filter 50ing and direct digital conversion in the RF front end of the sensor 10 to eliminate the need for dedicated down-conversion components.

In an exemplary embodiment, the sensor 10 comprises an LNA 30 for Amplification of low power RF fields for enhanced detection, discrimination, and assessment, constrained by Frequency range, gain, noise figure, OIP3, P1 dB, power consumption, and size; an ADC 40 which Converts received analog signal to digital signal for analysis in processing assets, constrained by Output bits of resolution, maximum sample rate, input bandwidth, power consumption, and size; a Computational Block or processing element which performs signal processing and analysis on detected RF fields, constrained by Number and type of processing cores, number of logic elements, cache sizes, on-chip RAM, benchmark performance, supported external interfaces, power consumption, and size.

Variation in the number of digitization bits across the range supported by the ADC 40 help to lower power settings, which affect sensitivity. Similar trade-offs between latency and power consumption occurs by varying the subthreshold voltage power level. Software-controlled power management schemes, that can be executed in the signal processing component 70, may be used to further reduce power consumption. The relationship between sensitivity and power draw is considered in optimizing the usefulness of additional power reduction on a dynamic basis as more or less power is available through energy harvesting source 90. Variation in the number of digitization bits across the range supported by the ADC 40 help to lower power settings, which affect sensitivity. Similar trade-offs between latency and power consumption occur by varying the subthreshold voltage power level during simulations. Software-controlled power management schemes, that can be executed in the signal processing component 70, can further reduce power consumption. The relationship between sensitivity and power draw is also considered in evaluating the usefulness of additional power reduction.

In an exemplary embodiment, the sensor 10 can be configured as a handheld device, for example, the layered configuration of FIG. 7 can be implemented in an elongated tubular housing, and can be utilized to determine the electronic health of a device through a passive, non-contact, non-destructive, and rapid test. Electronic Heath Monitoring (EHM) algorithms for determining remaining useful life (RUL) may be included into the sensor architecture to enhance monitoring capabilities. Additionally, miniaturizing RF sensor components and developing conformal antennas 24 for geometrically constrained applications may be an objective utilized in the sensor design.

In an exemplary embodiment, unintended emission phenomenology can be leveraged to determine the authenticity of complex ICs. It is effective for a broad range of critical parts, including, but not limited to, programmable logic, microprocessors, microcontrollers, and memory.

In an exemplary embodiment, omni-directional compressed conformal antenna 24 structures, requiring less than 100 times the volumetric requirements of competing antennas 24 can be used, which service devices with no degradation in gain characteristics compared to standard external antennas 24.

In an exemplary embodiment, a balance between sensitivity, power consumption, and size/packaging is achieved. The design may further be adapted for inclusion of an optimal manufacturing flow plan, demonstrating the feasibility of using standard CMOS or GaS processes for prototype manufacture.

In an exemplary embodiment, the sensor 10 may be used in medical equipment like pacemakers and blood glucose monitors, Satellites and space applications. It may similarly be used as an ultra-low SWaP RF field sensor 10 for monitoring equipment functionality over extended equipment lifespans.

In an exemplary embodiment, any of the above devices and/or method(s) provide an integrated ability to measure the ambient RF field surrounding an IC with high sensitivity and fidelity, thus further protecting devices while simultaneously enabling continual Electronic Health Monitoring (EHM) and other applications.

In an exemplary embodiment, any of the above described sensor 10s is configured as a reduced power, reduced size and/or reduced weight unintentional RF emission processing device especially directed towards retrofit onto existing electronic devices and PCBs, especially in an energy rich environment wherein energy harvesting means can be usefully employed in the reduced design assisted by the reductions stated above.

In an exemplary embodiment, any of the above described sensors 10 can be configured in a reduced size, reduced weight, reduced power unintended emission analysis apparatus for determining correct operation of electronic devices being monitored.

In an exemplary embodiment, the sensor 10 can be configured to target operating Field Programmable Gate Arrays (FPGAs) during bitstream loading and/or while processing critical algorithms.

In an exemplary embodiment, integration of the sensor 10 into any system can improve security and tamper protection of critical ICs while simultaneously providing assurance through continuous EHM.

In an exemplary embodiment, the sensor 10 can seamlessly integrated onto existing printed circuit 20 boards, providing constant security for and monitoring of the ICs populating the board.

In an exemplary embodiment, the sensor 10, configured as a rugged IC, is further configured to survive environmental conditions expected during transport, storage, and maintenance operations. Since the sensor 10 can be co-located onboard with the devices under protection, its inclusion does not introduce performance risks or costs to the platform and its operation.

Any of the above described exemplary embodiments provide solutions for detecting counterfeited, tampered or infected chips that does not require a detailed pre-knowledge of detailed expected device, system or subsystem operation or does not require solutions that must be specifically designed in hardware or modified in hardware to conform to the specific devices published specifications.

Any of the above described exemplary embodiments provide solutions that can be easily retrofitted onto previously designed, existing PCB boards, sub-systems or systems, and cannot be implemented onto them without extensive, complex, intrusive and costly modifications.

Any of the above described exemplary embodiments provide solutions that can use unintended emission artifacts (emission signature elements) generated by operational devices, sub-systems or systems as a basis for discrimination and comparison.

Any of the above described exemplary embodiments provide solutions that, if attempted on a retrofit of existing electronics, do not require significant added power, added space, added wiring, and added processing capability which may not be feasible based on the available power, available space, available heat budget. Such solutions do not incur significant costs each time when attempted on a new design.

Such solutions can be amenable to a generalized common approach and thus do not require significant design time to implement, test and validate.

Any of the above described exemplary embodiments provide solutions to monitor or retrofit onto an operational existing system, in production quantities, for the quality control purposes of verifying correct operation, system integrity, or the attempted introduction of malware, tampering, counterfeiting or the successful introduction of such undesirable operations previously.

Any of the above described exemplary embodiments provide solutions for unintended emission analysis that may not require power wiring to be attached or interfaced to the sensor arrangement portion of the unintended emission acquisition apparatus. Furthermore, the above described sensor arrangement can be typically co-located with the emission analysis circuitry, rather than remotely located.

Any of the above described exemplary embodiments provide solutions that do not to require power wiring at a specified voltage and current with associated noise filter 50*ing* or noise tolerance, this power cabling being in addition to the signaling from the sensor arrangement to the processing section. Thus, these solutions can be amenable to simple and facile retrofit onto an existing circuit board assembly with, to and amongst chips, multichip modules, and subsystems of varying dimensions, locations, heights. Further, these solutions do not require the LNA 30 to be substantially collocated with other digital processing circuitry which by their nature generate noise and require shield 28*ing* and other noise reduction means and design considerations to prevent processing noise from influencing the very low level signals being acquired and amplified by the arrangement of the antenna 24 and LNA 30.

Any of the above described exemplary embodiments provide solutions that do not require large and/or massive carefully shielded structures or multiple structures to thus shield 28 and separate the very low level unintended emissions received from the devices being verified/validated from the processor hardware analyzing said unintended emissions. Such large and necessary shield 28*ing* arrangements and power wiring furthermore do not lend themselves to retrofit in a densely packed circuit board with many chips and differing chips of varying size and separate unintended emission characteristics and signatures.

Any of the above described exemplary embodiments provide solutions that do not consume significant power and hence do not generate significant additional heat, that can adversely impact or exceed the overall power and heat dissipation budget of the existing PCB, chip, device, subsystem or system under test.

Any of the above described exemplary embodiments provide solutions that can utilize or harvest heat generated by the devices under test to supply or supplement power.

Any of the above described exemplary embodiments provide solutions that can take advantage of the unintended energy available and collocated with the unintended emissions available at the collection site to collect, preamplify and prepare the unintended emissions at that site for further processing nearby or substantially further away.

Any of the above described exemplary embodiments provide solutions that can utilize a variety of unintended energy harvestable resources collocated with the unintended emissions but not interfering with them such as mechanical vibration, heat differential, and unintended ambient RF energy at unneeded, unrelated frequencies relative to necessary emission analysis frequencies.

In an example, any of the above described exemplary embodiments can easily accommodate a densely packed arrangement of separate unintended emission acquisition sensors 10 adjacent other sensors 10 located on other emitting chips to be tested. In an example, any of the above described exemplary embodiments can easily prevent unintended emissions from adjacent chips from being received and complicating the analysis of the chip it is mounted on and dedicated to scrutinizing for validity. In an example, any of the above described exemplary embodiments can harvest ambient mechanical vibrations from a moving vehicle or object when it is operating and when analysis and scrutiny is most needed to ensure successful continued operation. In an example, any of the above described exemplary embodiments do not require substantial mechanical support means to hold them in place, adding structural size, weight and design considerations, especially in a high-G and/or vibration intensive environment. Finally, conventional solutions require orders of magnitudes more power and larger and hence heavier power generating means than the instant invention disclosed herein.

Any of the above described exemplary embodiments provide solutions which can be retrofitted onto existing devices and equipment without extensive and costly design changes.

Any of the above described exemplary embodiments provide solutions that can be easily adapted for a wide variety of devices or systems, reducing design costs, implementation costs and the need to understand specific operational characteristics of devices or systems under tests.

Any of the above described exemplary embodiments provide solutions which consume less power, thereby generating less heat.

Any of the above described exemplary embodiments provide solutions which also consume less space, in an existing space constrained retrofit arrangement. Any of the above described exemplary embodiments provide solutions which are capable of utilizing ambient energy available to supplement its power requirements.

Any of the above described exemplary embodiments provide solutions which substantially electrically isolate signals from the device being monitored from unneeded and unwanted adjacent or external signals.

Any of the above described exemplary embodiments provide solutions which can be mechanically retrofitted onto existing PCBs.

Any of the above described exemplary embodiments provide solutions which can isolate the low level emissions being acquiring from digital noise generated by the processing circuitry performing the analysis.

Any of the above described exemplary embodiments provide solutions which, by using very low power in digitally processing the unintended emission signal, also use less current and hence radiates less unwanted emissions itself which could radiate to interfere with the unintended emissions being received.

A combination of any two or more solutions can be combined into a single solution.

In accordance with an example embodiment, a low power sensor comprises: a hollow enclosure; an antenna disposed external to the hollow enclosure and configured to collect emission of electromagnetic energy; a circuit disposed within the hollow enclosure and comprising a low noise amplifier (LNA) connectable to the antenna, and an analog to digital converter (ADC) in a connection with the LNA; circuit connections connecting, during use of the sensor, the circuit to each of the antenna, a source of electric energy and a signal processing component; a connection between the enclosure and an enclosure of an integrated circuit (IC), whereby the antenna id disposed between the sensor and the IC; wherein the sensor configured to at least measure a low-level electromagnetic energy emitted from the IC. The sensor can further comprise a filter disposed in a signal path between the antenna and the LNA. The filter can comprises any one of hardware or software controlled band-pass filter, band-stop filter, low-pass filter and high-pass filter, the filter being tuned to specifically predesignated characteristic frequencies associated with the electromagnetic energy from the electrical and/or electronic devices. The sensor can further comprise a passive filter bank disposed in a signal path between the LNA and the ADC, the filter bank comprising an array of band-pass filters. The connection comprises an adhesive layer disposed on an exterior surface of the hollow housing. The sensor can further comprise the antenna encapsulated in the adhesive layer. The position of the circuit can be offset relative to a center of a profile of the antenna. The antenna can comprise a conformal antenna. The antenna can comprise fractal antenna. The circuit can be configured to draw power being less than 1 µW. The circuit can be configured to draw power being less than 0.5 µW. The sensor can further comprise the signal processing component integrated with the circuit into the hollow enclosure. The sensor further can comprise the source of electric energy. The source of electric energy can comprise energy harvesting member. The energy harvesting member can comprise of at least one of vibration-piezoelectric, vibration-electrostatic, vibration-magnetic, thermoelectric, and electromagnetic members. The circuit connections can comprise one or more pins extending outwardly from the exterior surface of the hollow enclosure. The pins can be configured for operatively attaching the sensor to a printed circuit board (PCB). The circuit connections can comprise a connector accessible from the exterior surface of the enclosure. The circuit connections connection can comprise a wireless transmitter and/or receiver 78. The sensor can be configured to operate when the low-level electromagnetic energy can be a radio-frequency (RF) energy in a range of between about 40 Mhz and about 100 Mhz. The sensor can be configured to operate as a spectrum analyzer. The sensor can be configured as at least one of a tamper detection device and a counterfeit circuit detection device. The sensor can be configured as a RUL estimation-reporting device. The sensor can be configured as a faulty circuit reporting device. The sensor can be configured as a faulty software reporting device. The sensor can be configured as a faulty integrated circuit reporting device. The sensor can be configured as a detector of malicious software. The sensor can be configured as a detector of malicious firmware. The sensor can be configured as a detector of malicious hardware. The sensor can be configured as a detector at least one of degraded hardware and the system can be not operationally-ready. The sensor can be wherein the sensor can be configured to process electromagnetic energy emitted from an electronic device being at least one of an FPGA, an ASIC, an Integrated Circuit, a memory element, and a CPU. The circuit can be configured to receive RF energy. The processing element can use an FFT transform. The LNA and the ADC can be configured as subthreshold based circuit elements. The sensor can further comprise a semiconducting die and wherein the LNA and the ADC are mounted on the semiconductor die. The sensor can further comprise a signal processing member can be mounted on the semiconductor die. The signal processing member can comprise a Power-aware General Purpose Processor (GPP). The signal processing member can comprise an Internal encrypted memory. The ADC can comprise an ENOB of 10 bits or better. The sensor can further can further comprise output ports for at least one of a control over the device, connection to the source of electric energy and the signal processing component and a reporting to an external user interface. The sensor of claim 1, wherein the ADC can comprise at least one of a Subthreshold, Source Coupled Circuit Topology, scalable folding and an interpolating ADC method.

In accordance with an example embodiment, a sensor comprises: a hollow enclosure; an layer of adhesive material disposed on one exterior surface of the hollow enclosure; an antenna disposed within the layer of adhesive material and configured to collect emission of low-level electromagnetic energy emitted from an electrical and/or an electronic device; a filter coupler to the antenna, the filter configured to pass a specific frequency of the electromagnetic energy collected at the antenna, the passed specific frequency defining a frequency signal; a low noise amplifier (LNA) coupled to the filter and magnifying the frequency signal; a filter bank coupled to the LNA and separating the frequency signal into components, each carrying a single frequency sub-band of the frequency signal; an analog to digital converter (ADC) in a connection with the LNA and converting the single frequency sub-band from an analog signal form into a non-transitory digital data; a signal processing component coupled to the ADC and processing the digital data received from the ADC; the filter, the LNA, the filter bank, the ADC and the signal processing component disposed within the hollow enclosure; a material enclosing the filter, the LNA, the filter bank, the ADC and the signal processing component; a connection connecting the LNA, ADC and the signal processing component to a source of electric energy and further connecting the signal processing component to an external interface; and the sensor configured to at least measure and process the low-level electromagnetic energy emitted from the electrical and/or electronic device.

In accordance with an example embodiment, an integrated circuit can comprise: a hollow enclosure; a die disposed within the hollow enclosure; circuit(s) disposed on the die; pins electrically coupled to the circuit(s) and extending outwardly from edge(s) of the hollow enclosure; an antenna disposed within the hollow enclosure adjacent the circuit(s), the antenna configured to collect emission of a low-level electromagnetic energy emitted from the circuit(s) when the circuit(s) can be being at least coupled to a source of electric energy; and a sensor disposed within the hollow enclosure and coupled to the antenna, the sensor configured to at least measure and process the low-level electromagnetic energy collected by the antenna. The sensor can be offset from a center of the antenna. The sensor can use analysis of Integrated CMOS and heterogeneous analog and digital components and signal processing software modules incorporated into single fabrication process. The sensor can be contained in a SiP. The sensor can use at least one of Subthreshold, Source Coupled and Subthreshold, standard CMOS technology. The sensor can be ruggedized to withstand at least one of excessive heat, vibration, and cold.

In accordance with an example embodiment, an integrated circuit can comprise: a first hollow enclosure; a die disposed within the hollow enclosure; circuit(s) disposed on the die; pins electrically coupled to the circuit(s) and extending outwardly from edge(s) of the first hollow enclosure; a sensor configured to at least measure and process the low-level electromagnetic energy emitted from the circuit(s) when the circuit(s) can be being at least coupled to a source of electric energy, the sensor defining a second hollow enclosure; an antenna disposed between exterior surface of the first and second hollow enclosures, the antenna coupled to the sensor and configured to collect the emission of the low-level electromagnetic energy emitted from the circuit (s); and a mechanical connection between the first and second hollow enclosures. The mechanical connection can comprise a layer of an adhesive material, the antenna being encapsulated within the layer of adhesive material. The mechanical connection can comprise a flange disposed on an exterior of one of the first and second hollow enclosures, the flange sized and shaped to receive, in a friction manner, an exterior portion of an opposite one of the first and second hollow enclosures, the antenna coupled to a circuitry within the sensor and collecting the low-level electromagnetic energy during use of the integrated circuit.

In accordance with an example embodiment, a sensor collecting and processing emissions of electromagnetic energy, can comprise: an antenna configured to collect emission of electromagnetic energy; a low noise amplifier (LNA) connectable to the antenna; an energy harvesting source coupled to the LNA; and a power management module coupled to the LNA.

The above method(s) may be implemented as a computer program executing on a machine, as a computer program product, or as a tangible and/or non-transitory computer-readable medium having stored instructions.

Tangible computer readable medium means any physical object or computer element that can store and/or execute computer instructions. Examples of tangible computer readable medium include, but not limited to, a compact disc (CD), digital versatile disc (DVD), blu-ray disc (BD), usb floppy drive, floppy disk, random access memory (RAM), read-only memory (ROM), erasable programmable read-only memory (EPROM), optical fiber, etc. It should be noted that the tangible computer readable medium may even be paper or other suitable medium in which the instructions can be electronically captured, such as optical scanning. Where optical scanning occurs, the instructions may be compiled, interpreted, or otherwise processed in a suitable manner, if necessary, and then stored in computer memory.

Alternatively, it may be a plugin or part of a software code that can be included in, or downloaded and installed into a computer application. As a plugin, it may be embeddable in any kind of computer document, such as a webpage, word document, pdf file, mp3 file, etc.

The disclosed method(s) may be implemented in the form of software stored on a computer-readable non-transitory information storage medium such as an optical or magnetic disk, a non-volatile memory (e.g., Flash or ROM), RAM, and other forms of volatile memory. The information storage medium may be an internal part of the computer, a removable external element coupled to the computer, or unit that is remotely accessible via a wired or wireless network.

According to an exemplary embodiment, the processing member may be implemented as a computer program executed by a computer. For example, the processing member may take a form of a computer program containing one or more sequences of machine-readable instructions describing a method as disclosed above, or a data storage medium (e.g., semiconductor memory, magnetic or optical disk) having such computer program stored therein.

Computer program code for carrying out operations for aspects of various embodiments may be written in any combination of one or more programming languages, including an object oriented programming language, such as Java, Smalltalk, C++, or the like, and conventional procedural programming languages, such as the "C" programming language or similar programming languages. In accordance with various implementations, the program code may execute entirely in the apparatus, partly on in the apparatus, as a stand-alone software package, partly in the apparatus and partly on a remote computer or entirely on the remote computer or server. In the latter scenario, the remote computer may be connected to the processing member in the apparatus through any type of wireless or non-wireless network, including a local area network (LAN) or a wide area network (WAN), or the connection may be made to an external computer (for example, through the Internet using an Internet Service Provider).

Any combination of one or more computer readable storage medium(s) may be utilized. A computer readable storage medium may be embodied as, for example, an electronic, magnetic, optical, electromagnetic, infrared, or semiconductor system, apparatus, or device, or other like storage devices known to those of ordinary skill in the art, or any suitable combination of computer readable storage mediums described herein. In the context of this document, a computer readable storage medium may be any tangible medium that can contain, or store a program and/or data for use by or in connection with an instruction execution system, apparatus, or device.

According to a further exemplary embodiment, the computer may comprise a communication module comprising the receiving and/or transmitting members.

Persons of ordinary skill in the art may appreciate that, in combination with the examples described in the embodiments herein, units and algorithm steps can be implemented by electronic hardware, computer software, or a combination thereof. In order to clearly describe the interchangeability between the hardware and the software, compositions and steps of every embodiment have been generally described according to functions in the foregoing description. Whether these functions are performed using hardware or software depends on particular applications and design constraints of the technical solutions.

A person skilled in the art may use different methods to implement the described functions for each specific application. However, such implementation should not be considered as beyond the scope of the present invention.

The chosen exemplary embodiments of the claimed invention have been described and illustrated for practical purposes so as to enable any person skilled in the art to which it pertains to make and use the same. It is therefore intended that all matters in the foregoing description and shown in the accompanying drawings be interpreted as illustrative and not in a limiting sense. It will be understood that variations, modifications, equivalents and substitutions for components of the specifically described exemplary embodiments of the invention may be made by those skilled in the art without departing from the spirit and scope of the invention as set forth in the appended claims.

Any element in a claim that does not explicitly state "means for" performing a specified function, or "step for" performing a specified function, is not to be interpreted as a "means" or "step" clause as specified in 35 U.S.C. § 112, ¶6. In particular, any use of "step of" in the claims is not intended to invoke the provision of 35 U.S.C. § 112, ¶6.

As used herein, the terms "coupled" or "connected" include direct and indirect connections. Moreover, where two devices/components are coupled or connected, intervening devices including active devices may be located therebetween.

Any numerical value, however, inherently contains certain errors necessarily resulting from the standard deviations found in their respective testing measurements.

The recitation of numerical ranges by endpoints includes all numbers subsumed within that range (e.g. 1 to 5 includes 1, 1.5, 2, 2.75, 3, 3.80, 4, and 5).

Furthermore, the Abstract is not intended to be limiting as to the scope of the claimed invention and is for the purpose of quickly determining the nature of the claimed invention.

What is claimed is:

1. A low power sensor, comprising:
    a hollow enclosure;
    an antenna disposed external to said hollow enclosure and configured to collect emission of electromagnetic energy;
    a circuit disposed within said hollow enclosure and comprising a low noise amplifier (LNA) connectable to said antenna, and an analog to digital converter (ADC) in a connection with said LNA;
    circuit connections connecting, during use of said sensor, said circuit to each of said antenna, a source of electric energy and a signal processing component;
    a connection between said hollow enclosure and an enclosure of an integrated circuit (IC), said connection comprises an adhesive layer disposed on an exterior surface of said hollow enclosure, said antenna being encapsulated in said adhesive layer, whereby said antenna is disposed between said sensor and the IC during use of said sensor; and
    said sensor configured to at least measure a low-level electromagnetic energy emitted from the IC.

2. The sensor of claim 1, further comprising a filter disposed in a signal path between said antenna and said LNA.

3. The sensor of claim 2, wherein said filter comprises any one of hardware or software controlled band-pass filter, band-stop filter, low-pass filter and high-pass filter, said filter being tuned to specifically predesignated characteristic frequencies associated with said electromagnetic energy emitted from the IC said electrical and/or electronic devices.

4. The sensor of claim 1, further comprising a passive filter bank disposed in a signal path between said LNA and said ADC, said filter bank comprising an array of band-pass filters.

5. The sensor of claim 1, wherein a position of said circuit is offset relative to a center of a profile of said antenna.

6. The sensor of claim 1, wherein said antenna comprises any one of a conformal antenna, and a fractal antenna.

7. The sensor of claim 6, wherein said circuit is configured to draw power being less than 0.5 µW.

8. The sensor of claim 1, further comprising said signal processing component integrated with said circuit into said hollow enclosure.

9. The sensor of claim 1, further comprising said source of electric energy.

10. The sensor of claim 9, wherein said source of electric energy comprises energy harvesting member.

11. The sensor of claim 10, wherein said energy harvesting member comprises at least one of vibration-piezoelectric, vibration-electrostatic, vibration-magnetic, thermoelectric, and electromagnetic members.

12. The sensor of claim 1, wherein said circuit connections comprises one or more pins extending outwardly from said exterior surface of said hollow enclosure.

13. The sensor of claim 1, wherein said LNA and said ADC are configured as subthreshold based circuit elements.

14. The sensor of claim 1, wherein said ADC comprises at least one of a Subthreshold, Source Coupled Circuit Topology, scalable folding and an interpolating ADC method.

15. An integrated circuit comprising:
    a first hollow enclosure;
    a die disposed within said first hollow enclosure;
    circuit(s) disposed on said die;
    pins electrically coupled to said circuit(s) and extending outwardly from edge(s) of said first hollow enclosure;
    a sensor configured to at least measure and process a low-level electromagnetic energy emitted from said circuit(s) when said circuit(s) is(are) being at least coupled to a source of electric energy, said senor defining a second hollow enclosure;
    an antenna disposed between exterior surfaces of said first and second hollow enclosures, said antenna coupled to said sensor and configured to collect the emission of the low-level electromagnetic energy emitted from said circuit(s); and
    a mechanical connection between said first and second hollow enclosures, said mechanical connection comprises a layer of an adhesive material, said antenna being encapsulated within said layer of adhesive material.

16. A sensor configured to collect and process emissions of electromagnetic energy from an integrated circuit (IC), comprising:
    an antenna configured to collect said emissions of electromagnetic energy;
    a low noise amplifier (LNA) connectable to said antenna;
    an analog-to-digital converter (ADC) coupled to said LNA, said ADC converts a frequency signal from said LNA in an analog form to a frequency signal in a digital form;
    a signal processing component configured to process said frequency signal in said digital form;
    an energy harvesting source coupled to said LNA;
    a power management module coupled to each of said LNA and said ADC;
    an enclosure, each of said LNA, said ADC, said signal processing component and said power management module disposed within said enclosure; and
    a layer of an adhesive material on an exterior surface of said enclosure, said antenna being encapsulated within said layer of adhesive material;
    said antenna being disposed between said enclosure and an enclosure of the IC during use of said sensor.

17. The sensor of claim 16, further comprising a selectable filter bank disposed in a signal path between said LNA and said ADC, said selectable filter bank comprising an array of band-pass filters, said selectable filter bank separates said frequency signal in said analog form into components, each component carrying a single frequency sub-band of said frequency signal in said analog form.

* * * * *